US007261387B2

(12) United States Patent
Nishikori et al.

(10) Patent No.: US 7,261,387 B2
(45) Date of Patent: Aug. 28, 2007

(54) INK JET PRINTING METHOD, INK JET PRINTING SYSTEM, INK JET PRINTING APPARATUS AND CONTROL PROGRAM

(75) Inventors: Hitoshi Nishikori, Tokyo (JP); Hiroshi Tajika, Kanagawa (JP); Daisaku Ide, Tokyo (JP); Takeshi Yazawa, Kanagawa (JP); Atsuhiko Masuyama, Tokyo (JP); Akiko Maru, Kanagawa (JP); Hirokazu Yoshikawa, Kanagawa (JP); Hideaki Takamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 10/952,791

(22) Filed: Sep. 30, 2004

(65) Prior Publication Data

US 2005/0073543 A1 Apr. 7, 2005

(30) Foreign Application Priority Data

Oct. 1, 2003 (JP) ............................ 2003-343690

(51) Int. Cl.
*B41J 2/205* (2006.01)
*G06K 15/02* (2006.01)

(52) U.S. Cl. ......................................... 347/15; 358/1.2

(58) Field of Classification Search .................. 347/15; 358/1.2

See application file for complete search history.

(56) References Cited

U.S. PATENT DOCUMENTS

| | | | | |
|---|---|---|---|---|
| 4,999,646 | A | 3/1991 | Trask | |
| 5,633,663 | A | 5/1997 | Matsubara et al. | |
| 5,739,828 | A | 4/1998 | Moriyama et al. | |
| 6,158,836 | A | 12/2000 | Iwasaki et al. | |
| 6,250,737 | B1 | 6/2001 | Matsubara et al. | |
| 6,302,508 | B1 | 10/2001 | Asauchi et al. | |
| 6,390,586 | B1 | 5/2002 | Takahashi et al. | |
| 6,601,939 | B2 * | 8/2003 | Fujita et al. | 347/15 |
| 6,631,972 | B2 | 10/2003 | Yazawa | |
| 6,702,415 | B2 * | 3/2004 | Kanda et al. | 347/15 |
| 7,139,096 | B2 * | 7/2006 | Ishikawa | 358/1.9 |
| 2002/0105557 | A1 | 8/2002 | Teshigawara et al. | |
| 2004/0041868 | A1 | 3/2004 | Maru et al. | |

FOREIGN PATENT DOCUMENTS

| | | |
|---|---|---|
| JP | 1-281944 | 11/1989 |
| JP | 5-278232 | 10/1993 |
| JP | 3184744 | 4/2001 |

* cited by examiner

*Primary Examiner*—Stephen Meier
*Assistant Examiner*—Rene Garcia, Jr.
(74) *Attorney, Agent, or Firm*—Fitzpatrick, Cella, Harper & Scinto

(57) ABSTRACT

An ink jet printing method is provided which, although it uses an ink jet print head with a fixed small ink ejection volume, can form an image with a desired density by performing data processing and printing at a lower pixel density. The dot arrangement pattern that determines the presence or absence of a printed dot in each of a plurality of element areas making up each pixel is allocated to the individual pixels according to their grayscale level. Then the printing dots are divided into a plurality of scans of the print head. At this time, for those pixels having a predetermined grayscale level, a plurality of dots are printed overlappingly in each of predetermined element areas of these pixels. This arrangement allows a greater number of dots than is determined by the allocated dot arrangement pattern to be printed in these pixels according to the grayscale level.

13 Claims, 16 Drawing Sheets

INK JET PRINTING METHOD, INK JET PRINTING SYSTEM, INK JET PRINTING APPARATUS AND CONTROL PROGRAM

BACKGROUND OF THE INVENTION

1. Field of the Invention

The present invention relates to an ink jet printing method, an ink jet printing system, an ink jet printing apparatus and a control program, all capable of expressing desired grayscale information by printing a print material on a print medium.

2. Description of the Related Art

As a growing number of information processing devices such as personal computers have proliferated in recent years, printing apparatus as an image forming terminal have also been developed and come into wide use. Among a variety of kinds of printing apparatus, an ink jet printing apparatus in particular, which performs printing by ejecting ink from nozzles onto a print medium, such as paper, cloth, plastic sheets and OHP sheets, is now a mainstream printing apparatus for personal use because of its excellent features including the use of a low-noise non-impact printing system, an ability to print at high density and at high speed, an ability to cope with color printing with ease, and low cost.

The advance in the ink jet printing technology has led to a higher print quality, a higher printing speed and lower cost and, in combination with the proliferation of personal computers and digital cameras (including those that can be used as single devices and those that are built into other devices such as mobile phones), has greatly contributed to making the printing apparatus popular even among personal users. With such a prevalence of printing apparatus, there are increasing demands even from personal users for further improvements in print quality. Recent years in particular have seen growing demands for a print system that allows easy home printing of pictures and for a high print quality that equals that of silver salt pictures.

When compared with general silver salt pictures, images formed by the ink jet printing apparatus have a problem of a characteristic graininess. Various countermeasures have been proposed in recent years and many printing apparatus incorporating such measures are also available. For example, there is an ink jet printing apparatus with an ink system which has light cyan and light magenta inks of reduced density in addition to commonly used cyan, magenta, yellow and black inks. With such an ink system, the light cyan or light magenta can be used in areas of lower grayscale level to reduce the graininess; and in areas of high grayscale level, normal cyan and magenta inks are used. This method has realized a wider color reproduction and a smooth tonality.

Another method reduces the graininess by making dots landing on a print medium smaller. To realize this method, a technology is being developed to minimize the size of ink droplets ejected from nozzles arrayed in a print head. In this case, in addition to reducing the ink droplet size, the print head is designed to incorporate a greater number of nozzles at a higher array density to produce a high-resolution image without compromising the printing speed.

While the personal use ink jet printing apparatus is required to be able to produce images of high quality close to that of the silver salt pictures as described above, it is often required to also output normal documents such as texts and tables. In printing such documents it is essential to print them at high speed, rather than at high quality like that of silver salt pictures. Therefore, general ink jet printing apparatus are provided with a plurality of print modes to allow the user to choose a desired mode as required (for example, Japanese Patent Application Laid-open No. 1-281944 (1989)).

However, not all technologies developed to improve the image quality can coexist with a print mode that places priority on low cost and high speed printing. For example, in an ink jet printing apparatus that cannot modulate a volume of ink ejected from the nozzles (referred to as an ejection volume), all ink droplets ejected from the nozzles arrayed in the print head are small drops of a fixed volume in order to reduce graininess; and dots formed of the fixed volume of ink are arranged at an appropriate resolution to produce a desired grayscale level (e.g., Japanese Patent No. 03184744). As the ejection volume decreases, the concentration or resolution of printed dots increases to produce a desired grayscale level. Further, the associated means and data processing, though complicated, are fixed to some extent. Therefore, even in a high-speed mode, there is no alternative but to use the fixed means and time-consuming data processing method, making it difficult to produce an image of a desired grayscale at a satisfactory printing speed.

SUMMARY OF THE INVENTION

The present invention has been accomplished to overcome the above problems. It is therefore an object of this invention to provide an ink jet printing method, an ink jet printing system, an ink jet printing apparatus and a control program, which, while using an ink jet print head having a fixed ejection volume to form small drops of ink, can produce a desired level of grayscale by performing data processing and printing at a lower print resolution than an appropriate print resolution for the fixed ejection volume. It is also an object of this invention to provide a control program to realize the above printing method.

In the first aspect of the present invention, there is provided an ink jet printing method to form an image on a print medium by scanning a print head over the print medium a plurality of times, wherein the print head ejects ink to form dots on the print medium according to image information made up of a matrix of pixels, each of pixel has a multi-valued grayscale level expressed by a combination of printing and non-printing of dots in element areas making up the pixel; the ink jet printing method comprising the steps of:

allocating a dot arrangement pattern to each pixel according to a grayscale level of the pixel, the dot arrangement pattern determining the presence or absence of a printed dot in each of the element areas making up the pixel;

dividing the printing of dots, which is based on the dot arrangement pattern produced by the allocation step, into a plurality of scans of the print head by using mask patterns and generating ejection data for each of the scans; and ejecting ink from the print head according to the ejection data generated by the ejection data generation step;

wherein, the mask patterns and the dot arrangement patterns are linked with each other so that the number of actually printed dots in predetermined element areas of a pixel having a predetermined grayscale level is larger than the number of dots determined by the allocation step by a predetermined number.

In the second aspect of the present invention, there is provided an ink jet printing method to form an image on a print medium by scanning a print head over the print medium a plurality of times, wherein the print head ejects ink to form dots the print medium according to image information made up of on a matrix of pixels, each of which has a multi-valued grayscale level expressed by a combination of printing and non-printing of dots in element areas making up the pixel; the ink jet printing method comprising the steps of:

converting the multi-valued grayscale level to a binary level by allocating a dot arrangement pattern to each pixel according to a grayscale level of the pixel, the dot arrangement pattern determining the presence or absence of a printed dot in each of the element areas making up the pixel;

dividing the printing of dots, which is based on the dot arrangement pattern produced by the conversion step, into a plurality of scans of the print head by using mask patterns and generating ejection data for each of the scans; and ejecting ink from the print head according to the ejection data generated by the ejection data generation step;

wherein the mask patterns and the dot arrangement patterns are linked with each other so that, for pixels having a first multi-valued grayscale level, the number of actually printed dots is a predetermined number larger than the number of dots determined by the conversion processing and that, for pixels having a second multi-valued grayscale level, which is lower than the first grayscale level, the number of actually printed dots is equal to the number of dots determined by the conversion processing.

In the third aspect of the present invention, there is provided an ink jet printing system to form an image on a print medium by scanning a print head over the print medium a plurality of times, wherein the print head ejects ink to form dots on the print medium according to image information made up of a matrix of pixels, each of which has a multi-valued grayscale level expressed by a combination of printing and non-printing of dots in element areas making up the pixel; the ink jet printing system comprising:

a conversion means for converting multi-valued grayscale level to a binary level by allocating a dot arrangement pattern to each pixel according to a grayscale level of the pixel, the dot arrangement pattern determining the presence or absence of a printed dot in each of the element areas making up the pixel;

means for dividing the printing of dots, which is based on the dot arrangement pattern produced by the conversion means, into a plurality of scans of the print head by using mask patterns and for generating ejection data for each of the scans; and an ejection means for ejecting ink from the print head according to the ejection data generated by the ejection data generation means;

wherein the mask patterns and the dot arrangement patterns are related with each other so that, for pixels having a first multi-valued grayscale level, the number of actually printed dots is a predetermined number larger than the number of dots determined by the conversion means and that, for pixels having a second multi-valued grayscale level, which is lower than the first grayscale level, the number of actually printed dots is equal to the number of dots determined by the conversion means.

In the fourth aspect of the present invention, there is provided an ink jet printing system to form an image on a print medium by scanning a print head over the print medium a plurality of times, wherein the print head ejects ink to form dots on the print medium according to image information made up of a matrix of pixels, each of which has a multi-valued grayscale level expressed by a combination of printing and non-printing of dots in element areas making up the pixel; the ink jet printing system comprising:

means for allocating a dot arrangement pattern to each pixel according to a grayscale level of the pixel, the dot arrangement pattern determining the presence or absence of a printed dot in each of the element areas making up the pixel;

means for dividing the printing of dots, which is based on the dot arrangement pattern produced by the allocation means, into a plurality of scans of the print head by using mask patterns and for generating ejection data for each of the scans; and an ejection means for ejecting ink from the print head according to the ejection data generated by the ejection data generation means;

wherein, the mask patterns and the dot arrangement patterns are linked with each other so that the number of actually printed dots in predetermined element areas of a pixel having a predetermined grayscale level is larger than the number of dots determined by the allocation step, by a predetermined number.

In the fifth aspect of the present invention, there is provided an ink jet printing system to form an image on a print medium by scanning a print head over the print medium a plurality of times, wherein the print head ejects ink to form dots on the print medium according to image information made up of a matrix of pixels, each of which has a multi-valued grayscale level expressed by a combination of printing and non-printing of dots in element areas making up the pixel; the ink jet printing system comprising:

a conversion means for converting multi-valued grayscale level to a binary level by allocating a dot arrangement pattern to each pixel according to a grayscale level of the pixel, the dot arrangement pattern determining the presence or absence of a printed dot in each of the element areas making up the pixel;

means for dividing the printing of dots, which is based on the dot arrangement pattern produced by the conversion means, into a plurality of scans of the print head by using mask patterns and for generating ejection data for each of the scans; and an ejection means for ejecting ink from the print head according to the ejection data generated by the ejection data generation means;

wherein the ejection data generation means adopts the mask patterns that cause a plurality of dots to be printed overlappingly in each of predetermined element areas and the conversion means adopts the dot arrangement patterns so linked with the mask patterns that a total number of dots printed in the pixel is uniquely determined by the multi-valued grayscale level.

In the sixth aspect of the present invention, there is provided an ink jet printing system to form an image on a print medium by scanning a print head over the print medium a plurality of times, wherein the print head ejects ink to form dots on the print medium according to image information made up of a matrix of pixels, each of which has a multi-valued grayscale level expressed by a combination of printing and non-printing of dots in element areas making up the pixel; the ink jet printing system comprising:

a first conversion means for converting multi-valued grayscale level to a binary level by allocating a first dot arrangement pattern to each pixel according to a grayscale level of the pixel, the first dot arrangement pattern determining the presence or absence of a printed dot in each of the element areas making up the pixel;

a second conversion means for converting multi-valued grayscale level to a binary level by allocating a second dot arrangement pattern to each pixel according to a grayscale level of the pixel, the first dot arrangement pattern determining the presence or absence of a printed dot in each of the element areas making up the pixel;

a first ejection data generation means for dividing the printing of dots, which is based on the first dot arrangement pattern produced by the first conversion means, into a plurality of scans of the print head by using first mask pattern and for generating ejection data for each of the scans;

a second ejection data generation means for dividing the printing of dots, which is based on the second dot arrangement pattern produced by the second conversion means, into a plurality of scans of the print head by using second mask pattern and for generating ejection data for each of the scans; and an ejection means for ejecting ink from the print head according to the ejection data generated by the first ejection data generation means or second ejection data generation means;

wherein the first mask pattern and the first dot arrangement pattern are so linked with each other that the number of actually printed dots is equal to the number of dots determined by the first conversion means, and the second mask pattern and the second dot arrangement pattern are so linked with each other that the number of actually printed dots is larger than the number of dots determined by the second conversion means.

In the seventh aspect of the present invention, there is provided an ink jet printing apparatus to form an image on a print medium by scanning a print head over the print medium a plurality of times, wherein the print head ejects ink to form dots on the print medium according to image information made up of a matrix of pixels, each of which has a multi-valued grayscale level expressed by a combination of printing and non-printing of dots in element areas making up the pixel; the ink jet printing apparatus comprising:

a storage unit to store dot arrangement patterns used to convert the multi-valued grayscale level to a binary level by allocating a dot arrangement pattern to each pixel according to a grayscale level of the pixel, the dot arrangement pattern determining the presence or absence of a printed dot in each of the element areas making up the pixel; and a storage unit to store mask patterns used to divide the printing of dots, which is based on the dot arrangement pattern, into a plurality of scans of the print head and generate ejection data for each of the scans;

wherein the mask patterns and the dot arrangement patterns are related with each other so that, for pixels having a first multi-valued grayscale level, the number of actually printed dots is a predetermined number larger than the number of dots determined by the allocated dot arrangement pattern and that, for pixels having a second multi-valued grayscale level, which is lower than the first grayscale level, the number of actually printed dots is equal to the number of dots determined by the allocated dot arrangement pattern.

In the eighth aspect of the present invention, there is provided a control program realizing the ink jet printing method of the above first aspect.

The above and other objects, effects, features and advantages of the present invention will become more apparent from the following description of embodiments thereof taken in conjunction with the accompanying drawings.

DETAILED DESCRIPTION OF PREFERRED EMBODIMENTS (First Embodiment)

Now, a first embodiment of this invention will be described in detail.

Figure 1:
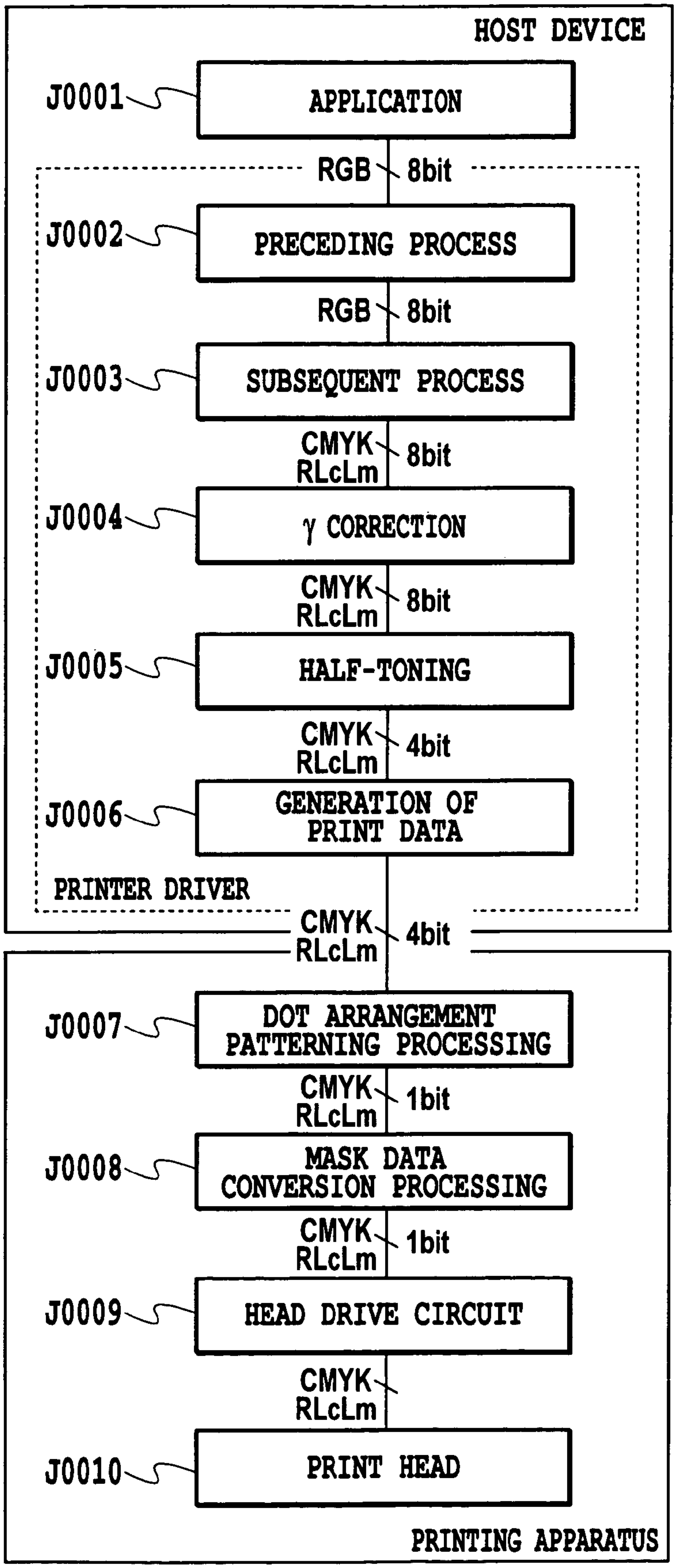
FIG. 1 is a block diagram showing a flow of image data conversion processing in an embodiment applicable to this invention.

FIG. 1 is a block diagram showing a flow of image data conversion processing in this embodiment. An ink jet printing apparatus applied to this embodiment uses red, light cyan and light magenta inks in addition to the basic color inks of cyan, magenta, yellow and black and thus has a print head capable of ejecting these seven color inks. Processing shown in FIG. 1 is executed by a printing apparatus and a personal computer as a host device.

Among programs running on an operating system of the host device, there are an application and a printer driver. An application J0001 executes processing to generate image data to be printed by the printing apparatus. In actual printing, the image data generated by the application is transferred to the printer driver.

In the printing system of this embodiment, the user can select a desired print mode by using the printer driver. In this embodiment, at least two print modes, a high quality photo mode and a high speed mode, can be selected and processing performed following those of the printer driver can be designed to be independent of each other to some extent according to the print mode.

First, processing performed during the printing in the high quality photo mode will be explained.

The printer driver in this embodiment has, as processing to be performed, preceding process J0002, subsequent process J0003, a γ-correction J0004, a half-toning J0005 and a print data generation J0006. Each of these processing is briefly explained here. The preceding process J0002 performs mapping of gamut. Then a data conversion is performed to map the gamut reproduced by the image data R, G, B of sRGB standard into a color space reproduced by the printing apparatus. More specifically, this processing involves transforming 8-bit data for R, G, B into RGB 8-bit data of different content by using a three-dimensional LUT.

Based on the gamut-mapped data R, G, B, the subsequent process J0003 determines color separation data Y, M, C, K, R, Lc and Lm corresponding to a combination of inks that reproduce the color represented by the gamut-mapped data. Here, an interpolation calculation using the three-dimensional LUT is also performed as in the preceding process.

The γ-correction J0004 performs, for each color, a grayscale value conversion operation on the color separation data determined by the subsequent process J0003. More specifically, by using a one-dimensional LUT that corresponds to the grayscale characteristic of each color ink of the printing apparatus, the conversion matches the color separation data linearly to the grayscale characteristic of the printing apparatus.

The half-toning J0005 performs a quantization to transform 8-bit color separation data Y, M, C, K, R, Lc, Lm into 4-bit data. In this embodiment, an error diffusion method is used to transform 8-bit 256-grayscale data into 4-bit 9-grayscale data. The 4-bit data constitutes indices that represent arrangement patterns in the dot arrangement patterning processing by the printing apparatus.

As the last processing executed by the printer driver, the print data generation J0006 adds print control information to print image data containing the 4-bit index data to generate print data.

The printing apparatus performs dot arrangement patterning processing J0007 and mask data conversion processing J0008 on the print data supplied.

The dot arrangement patterning processing J0007 in the high quality mode of this embodiment will be explained. In the above half-toning processing, 256-value grayscale information (8-bit data) is transformed into 9-value grayscale information (4-bit data). However, the information the ink jet printing apparatus of this embodiment can actually print is binary information as to whether or not ink is ejected. The dot arrangement patterning processing has a function of transforming the 9-level (0–8) data into the 2-level data. More precisely, each pixel represented by 4-bit data of levels 0–8, which is output from the half-toning processing, is assigned a dot arrangement pattern corresponding to the grayscale value (levels 0–8) of that pixel. This arrangement defines dot-on/dot-off for each of the element areas in one pixel. That is, 1-bit ejection data, “1” or “0”, is assigned to each element area in one pixel.

Figure 2:
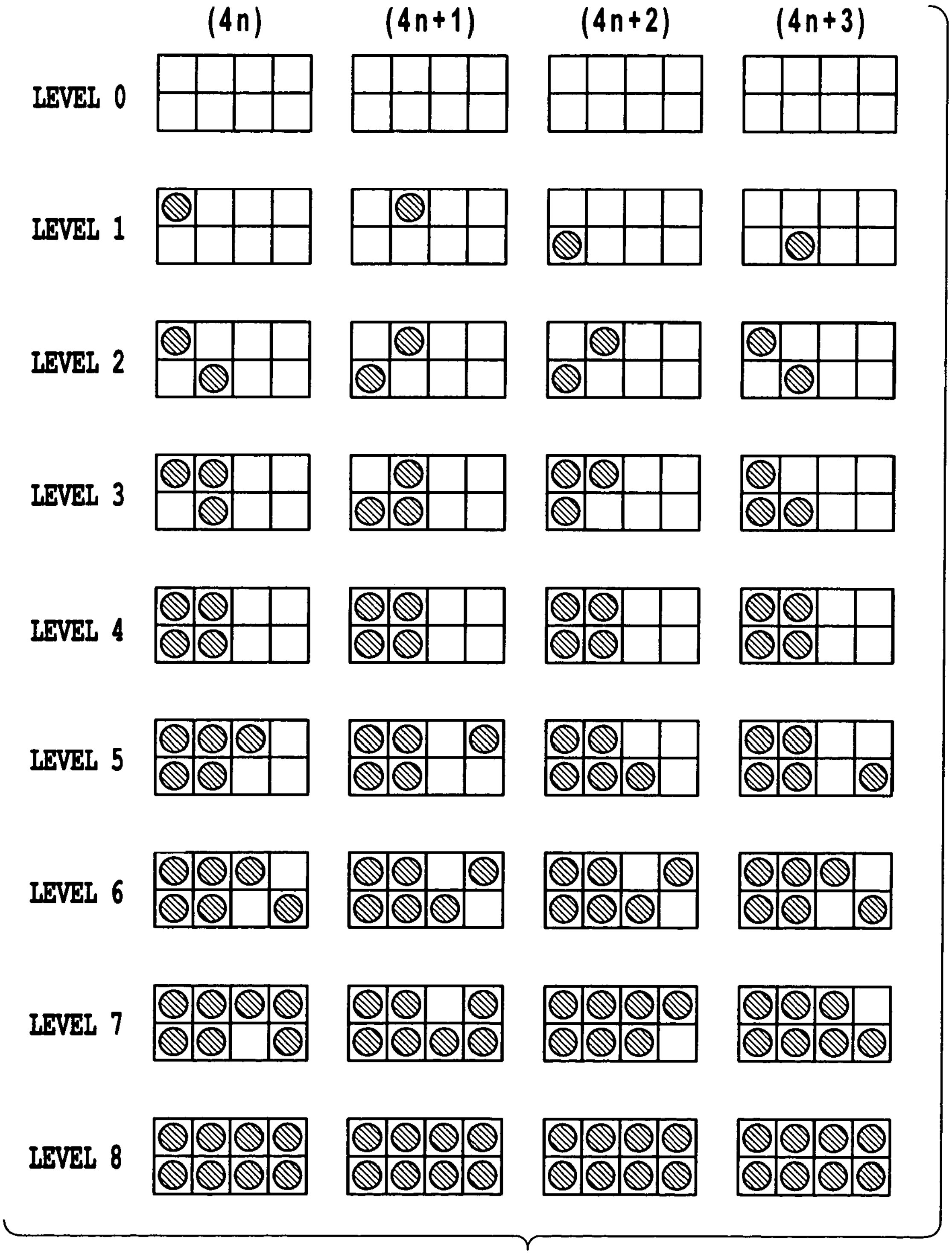
FIG. 2 illustrates output patterns for input levels 0–8 produced by a dot arrangement patterning processing in a high quality mode in a first embodiment of this invention.

FIG. 2 shows output patterns for input levels 0–8 produced by the dot arrangement patterning processing in the high quality mode of this embodiment. The level values shown to the left of the figure correspond to level 0 to level 8, which are output from the half-toning processing. Each of rectangular areas (2 vertical elements×4horizontal elements) shown to the right constitutes one pixel, output from the half-toning processing, and the areas has a size correspond to a resolution of 600 ppi (pixels/inch) in both the vertical and horizontal directions. The element areas in each pixel are minimum unit area for each of which dot-on/dot-off is defined. The elements are arranged at a resolution corresponding to 120.0 dpi (dots/inch) vertically and 2400 dpi horizontally. In the printing apparatus of this embodiment, one ink droplet of 2 pl is applied to one element area measuring about 20 μm vertically and 10 μm horizontally, which match the above resolution, to produce a desired grayscale value.

In FIG. 2, the vertical direction is a direction in which nozzles of the print head are arrayed, and the array density of the element areas and the array density of nozzles have the same resolution of 1200 dpi. The horizontal direction is a direction in which the print head scans. In the high quality photo mode of this embodiment, the print head performs printing at a resolution of 2400 dpi.

Further, in the figure, element areas marked with a shaded circle are areas in which a dot is formed. As the level number increases, the number of dots also increases by one at a time.

(4n)–(4n+3), where n is an integer equal to or larger than 1, represent horizontal pixel positions from the left end of an input image. Patterns shown below the horizontal pixel positions indicate that, even at the same input level, a plurality of different patterns is provided according to the pixel position. That is, if the same level is input, one of four different dot arrangement patterns shown below (4n)–(4n+3) is cyclically applied to a print medium. This arrangement produces various effects, such as spreading the number of ejections between the nozzles situated at a top row of the dot arrangement pattern and the nozzles situated at a bottom row and spreading various noise characteristic of the printing apparatus.

In the high quality photo mode of this embodiment, the grayscale information on an original image is presented in the form described above. After the dot arrangement patterning processing is completed, all the dot arrangement patterns to be committed to the print medium are determined.

The mask data conversion processing J0008 in the high quality photo mode will be explained. The presence or absence of dot in each element area on the print medium was determined by the dot arrangement patterning processing. Thus, inputting this information as is to the print head drive circuit can print a desired image. However, the ink jet printing apparatus normally employs a multi-pass printing method. The multi-pass printing method will be briefly explained as follows.

Figure 3:
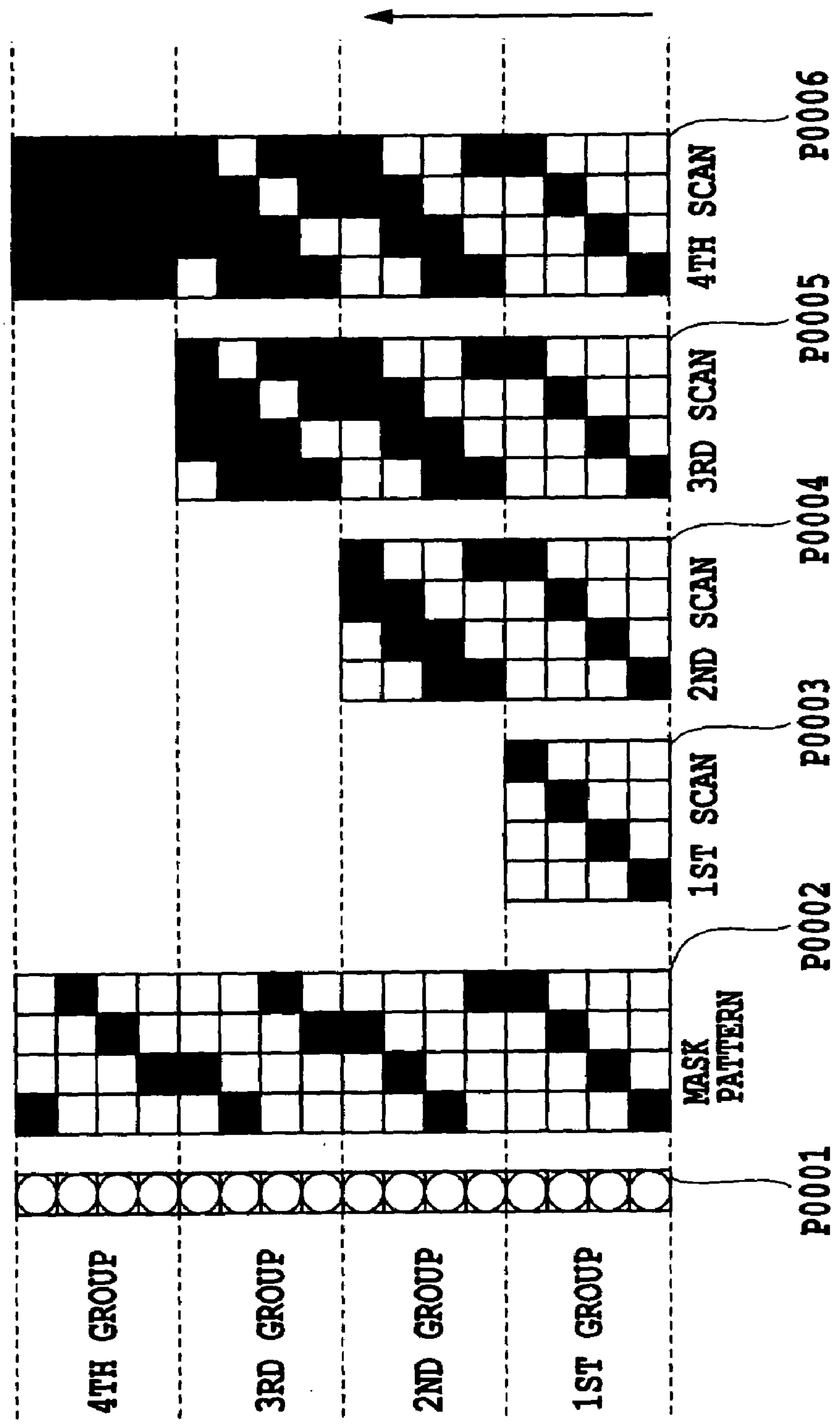
FIG. 3 schematically illustrates a print head and a printed pattern to explain a multi-pass printing method.

FIG. 3 schematically illustrates a print head and print patterns for an explanation of multi-pass printing method. P0001 represent the print head which has only 16 nozzles for simplicity. These nozzles are divided into four nozzle groups (first to fourth group) each having four nozzles. P0002 represents mask patterns which show in solid black those element areas where the associated nozzles can print (printable element areas). The patterns that the associated nozzle groups print are complementary to each other. That is, these patterns, when overlapped together, form a final print pattern for an area corresponding to the 4×4element areas.

Patterns represented by P0003–P0006 show how a printed image is progressively formed as the scan proceeds. Each time one scan finishes, the print medium is fed a distance corresponding to the width of each nozzle group in the direction of arrow. Thus, in the same area on the print medium (area corresponding to the width of each nozzle group) an image is complete after four successive scans.

Forming an image in the same area on the print medium in a plurality of scans using a plurality of nozzle groups, as described above, has an effect of reducing variations characteristic of nozzles and variations in the precision of print medium feeding.

Figure 4:
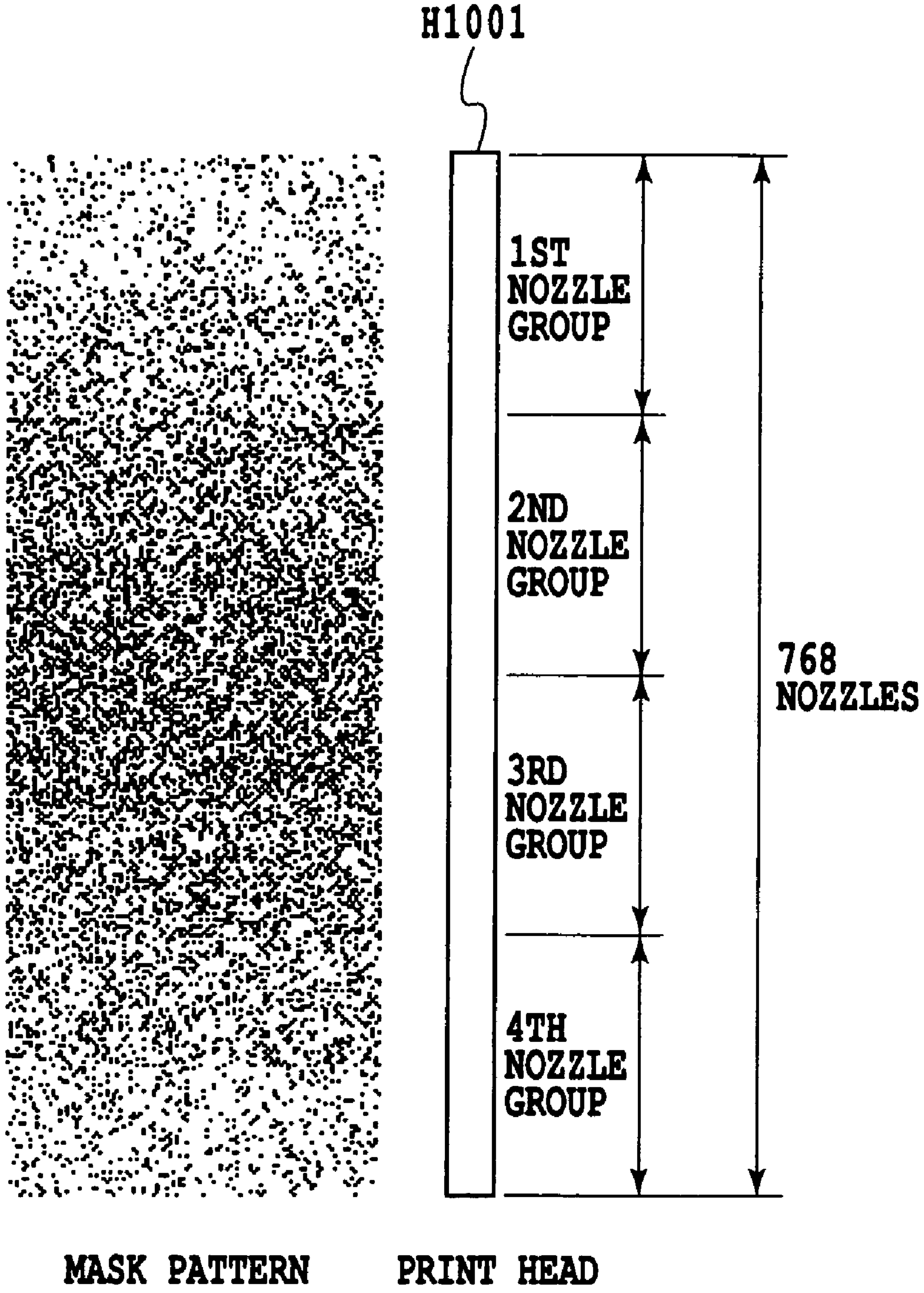
FIG. 4 illustrates a mask pattern actually applied to the high quality photo mode in the first embodiment of this invention.

FIG. 4 shows a mask pattern actually used in the high quality photo mode of this embodiment. The print head H1001 used in this embodiment has 768 nozzles. In the high quality photo mode, 4-pass printing is performed as in FIG. 3. Thus, four nozzle groups each has 192 nozzles. The mask pattern measures 768 element areas, equal to the number of nozzles, in the vertical direction and 256 element areas in the horizontal direction and is constructed so that four areas corresponding to the four nozzles groups complement each other.

In an ink jet print head used in this embodiment which ejects large numbers of small ink droplets at high frequency, it is observed that an air flow is produced near the printing unit during a printing operation and has adverse effects on the direction of ink ejection from those nozzles situated at the end of the print head. Therefore, the mask pattern for the high quality mode of this embodiment, as can be seen from FIG. 4, is provided with deviations in a printability percentage distribution according to the area among the nozzle groups or even in one and the same nozzle group. As shown in FIG. 4, by using a mask pattern in which the printability percentages for the end nozzles are reduced compared with those of nozzles at the central portion, it is possible to make less noticeable image impairments caused by deviations in landing positions of ink droplets ejected from the end nozzles.

In this embodiment, the mask data shown in FIG. 4 and a plurality of mask data used in other print modes are stored in memory in the printing apparatus. In the mask data conversion processing, the mask data in question and the output signal from the dot arrangement patterning processing are ANDed to determine element areas that are to be printed in each scan and the element areas data is sent as an output signal to the head drive circuit J0009 of the print head H1001.

One-bit data for each color entered into the head drive circuit J0009 is converted into drive pulses for the print head J0010 that causes ink to be ejected from the nozzles at predetermined timings.

The dot arrangement patterning processing and the mask data conversion processing in the printing apparatus are executed under the control of CPU making up the control unit of the printing apparatus by using dedicated hardware circuits.

Next, processing performed by this embodiment when printing in a high speed mode will be explained. The high speed mode, too, can be explained by referring to the flow of processing shown in FIG. 1. In the high speed mode, however, only four basic color inks, cyan, magenta, yellow and black, are used to reduce the processing time. Thus, the subsequent process J0003 transforms 8-bit data for R, G, B into 8-bit data for C, M, Y, K and the subsequent processing processes the data of four colors, C, M, Y, K.

The half-toning J0005, as in the high quality photo mode, performs quantization to transform 8-bit color separation data into 4-bit data. This high speed mode, however, uses a multi-valued dither pattern rather than the error diffusion method in performing a quantization to transform 256-grayscale 8-bit data into 5-grayscale 4-bit data. That is, the index data representing the arrangement pattern in the dot arrangement patterning processing is 4-bit data, as in the high quality photo mode, but contains information representing 5 grayscale levels.

The print data generation J0006 generates print data which has print control information added to the print image information containing the 4-bit index data. This is similar to the high quality photo mode.

As in the high quality photo mode, the printing apparatus performs the dot arrangement patterning processing J0007 and the mask data conversion processing J0008 on the print data supplied.

Now, the dot arrangement patterning processing J0007 in the high speed mode of this invention will be explained. The dot arrangement patterning processing in the high speed mode transforms 5-level data (0–4) into 2-level data that determines presence or absence of dot. More specifically, for each pixel represented by 4-bit data of level 0–4 from the half-toning processing, a dot arrangement pattern corresponding to the grayscale value (level 0–4) of that pixel is allocated. This arrangement defines dot-on/dot-off for each of the element areas in one pixel and assigns 1-bit ejection data, “1” or “0”, to each element area in one pixel.

Figure 5:
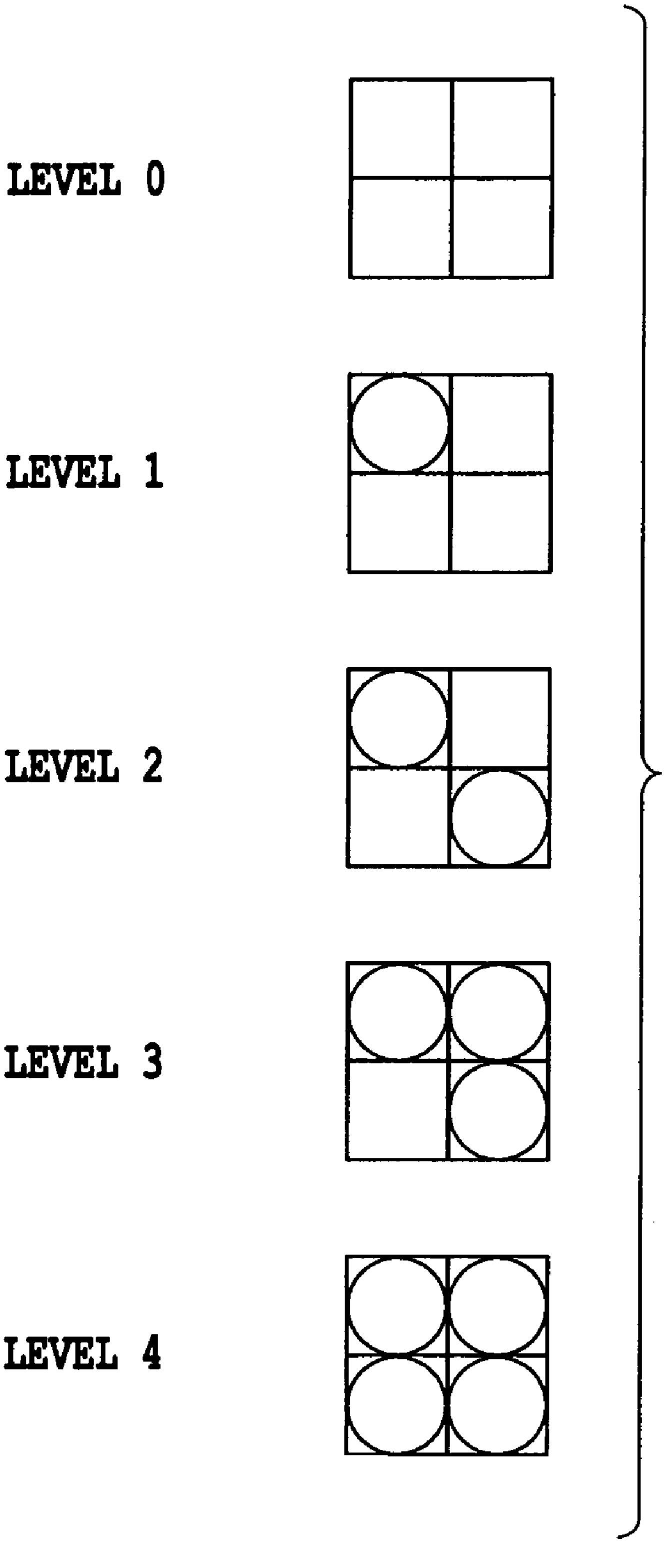
FIG. 5 illustrates output patterns for input levels 0–4 produced by the dot arrangement patterning processing in a high speed mode in the first embodiment of this invention.

FIG. 5 shows output patterns for input levels 0–4 produced by the dot arrangement patterning processing in the high speed mode of this embodiment. The level values shown to the left of the figure correspond to level 0 to level 4, which are output from the half-toning processing. Each of matrix areas (2 vertical elements×2horizontal elements) shown to the right constitutes one pixel, output from the half-toning processing. In the preceding high quality photo mode, each pixel, which has a resolution of 600 ppi when output from the half-toning processing, has its element areas arranged at a resolution of 1200 dpi vertically and 2400 dpi horizontally. In the high speed mode, each pixel with a resolution of 600 ppi is printed in the matrix of 2 vertical element areas×2 horizontal element areas.

Further, in the high speed mode, one of a plurality of dot arrangement patterns at the same level is not cyclically allocated as it is in the high quality photo mode shown in FIG. 2. At any one level only one dot arrangement pattern is provided.

As described above, since in the high speed mode the matrix pattern for each pixel is small, i.e., 2 element areas×2 element areas, and the cyclically applicable pattern is limited to only one pattern, the memory area to store the dot arrangement patterns can be minimized, when compared with the high quality photo mode.

The mask data conversion processing J0008 in the high speed mode of this invention will be explained in the following. In the high speed mode of this embodiment, 3-pass printing is performed.

Figure 6:
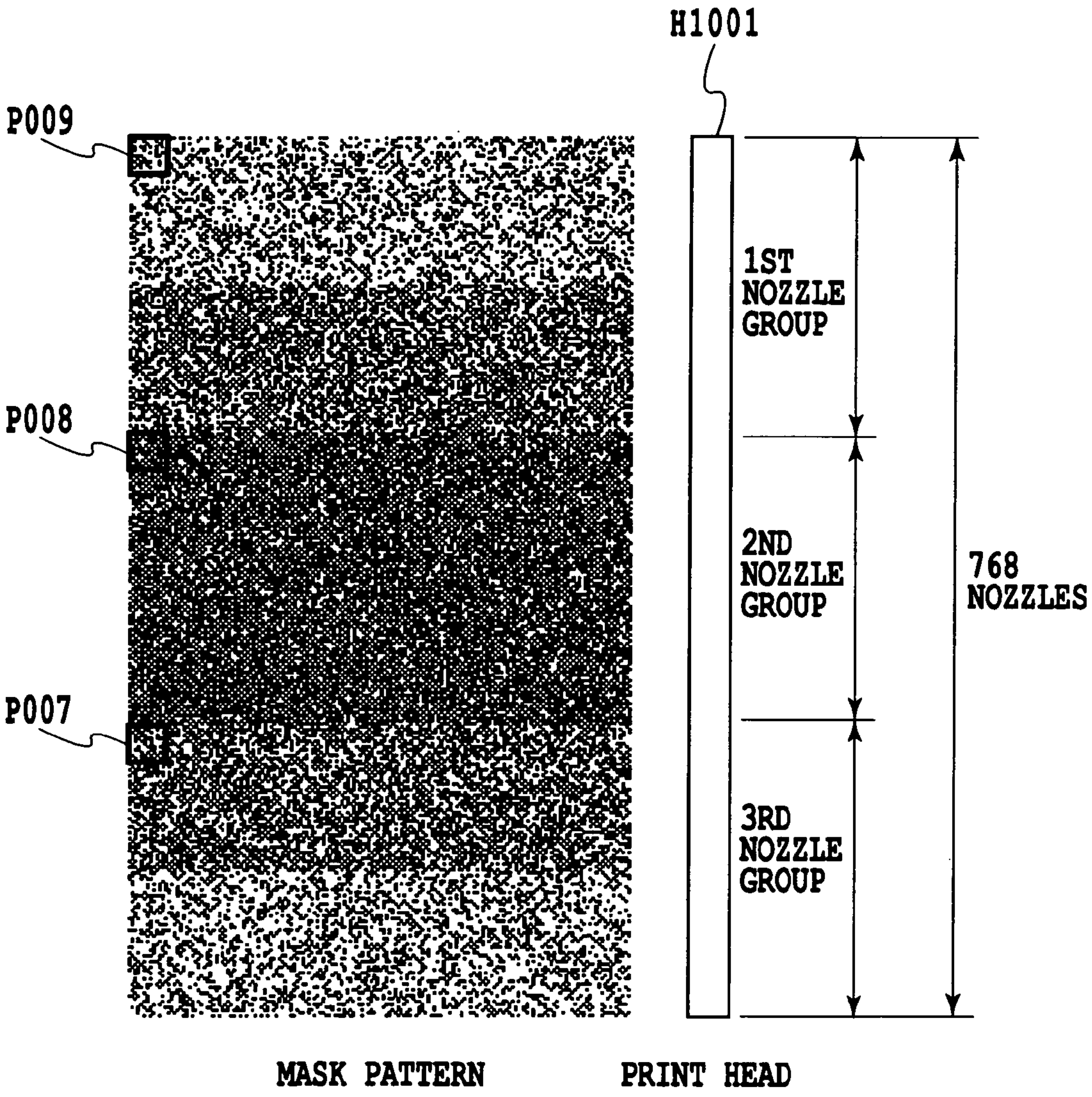
FIG. 6 illustrates a mask pattern actually applied to the high speed mode in the first embodiment of this invention.

FIG. 6 shows a mask pattern actually used in the high speed mode of this embodiment. The print head H1001 used in this embodiment has 768 nozzles. Since the 3-pass printing is performed here, 768 nozzles are divided into three groups of 256 nozzles. The mask pattern measures 768 element areas, equal to the number of nozzles, in the vertical direction and 386 element areas in the horizontal direction. In the high speed mode of this embodiment, each nozzle group prints 50% on average and overlapping the three nozzle groups in the successive printing scans result in 150% printing.

An object and a configuration of the 150% printing will be detailed in the following. As described above, in the high speed mode of this embodiment, in an area represented by one pixel output from the half-toning J0005, the dot arrangement patterning processing explained by referring to FIG. 5 prints up to four dots. However, the printing apparatus of this embodiment is designed to print up to eight small drops of 2 pl in one pixel, as described earlier in the high quality photo mode. Thus, if printing is done in the high speed mode by applying only four dots to each pixel, the pixel will have fewer dots than is necessary, resulting in an image with an insufficient grayscale level. In this embodiment, the mask data conversion processing makes up for the dot shortage in the high speed mode.

Figure 7:
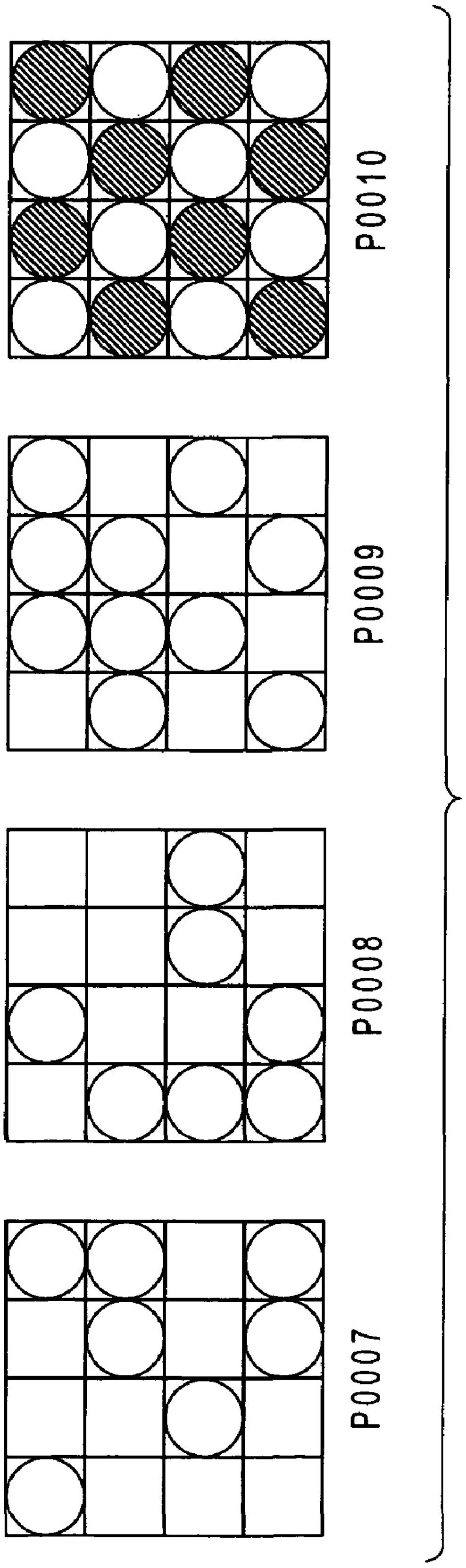
FIG. 7 are enlarged views of upper left corner areas of 4×4elements P0007–P0009 corresponding to the respective nozzle groups of the mask pattern of FIG. 6.

FIG. 7 shows enlarged views of areas P0007–P0009 of 4 element areas×4 element areas, situated at an upper left corner of each of the mask patterns of FIG. 6 corresponding to the nozzle groups. These three patterns are printed overlapping each other on a print medium in successive scans. P0010 represents a result of overlapping the patterns P0007–P0009. In the patterns P0007–P0009, element areas marked with a blank circle represent those printed with an ink drop of 2 pl in a scan. In the pattern P0010, element areas marked with a blank circle represent those printed with one 2-pl dot and element areas marked with a shaded circle represent those printed with two 2-pl dots, i.e., a total of 4 of ink. As shown in the pattern P0010, the shaded circles and blank circles are arranged in a staggered relation to each other. In one pixel area constituted a 2-element×2-element, up to six dots is printed. And all pixel areas are similar to each other in arrangement of dots.

Figure 8:
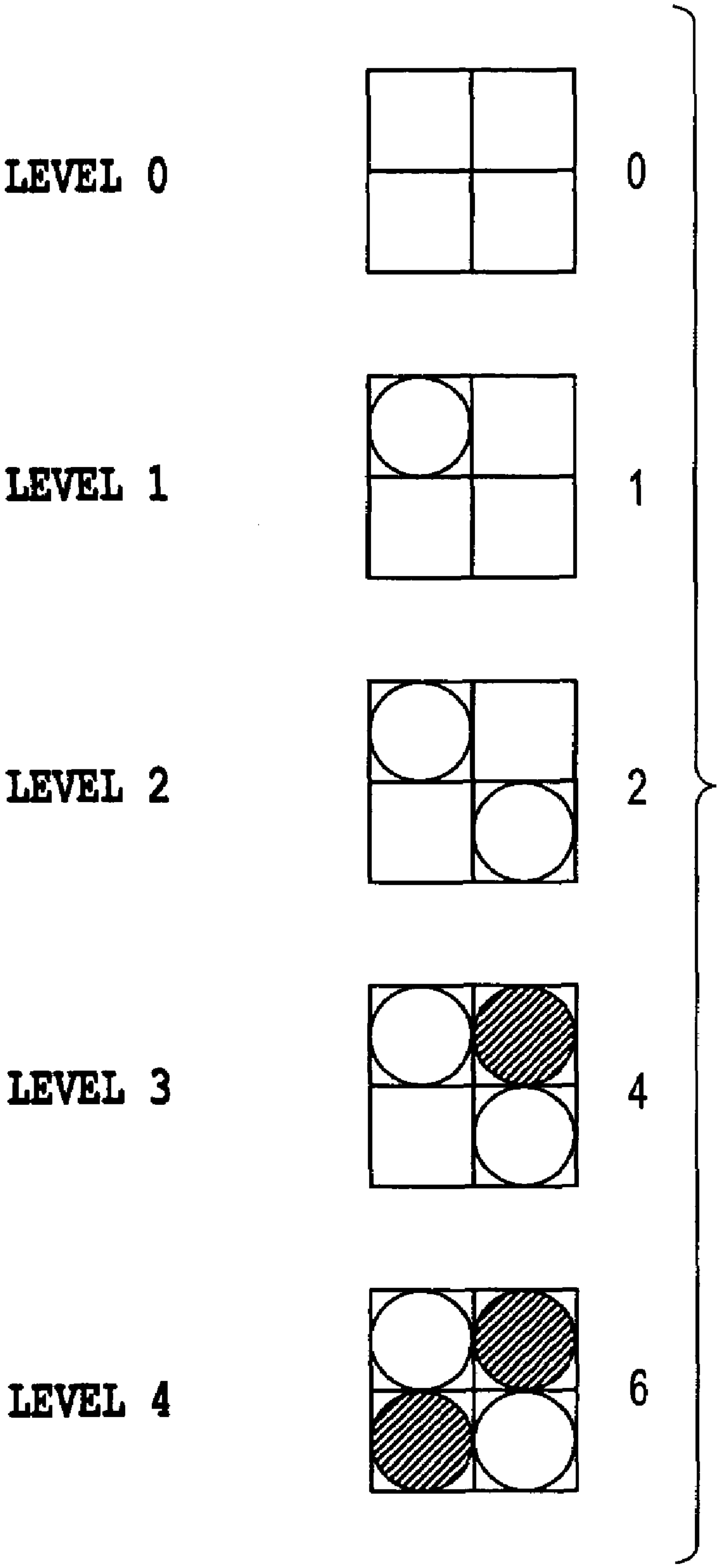
FIG. 8 illustrates dot arrangements and the number of dots printed for the input levels 0–4 of FIG. 5.

FIG. 8 shows dot arrangements and the number of dots printed for the input levels 0–4 of FIG. 5. In the figure, blank circles represent element areas to be printed with one ink drop of 2 pl, shaded circles represent element areas to be printed with two 2-pl ink drops, and unmarked element areas represent element areas where no ink drop is applied. As shown in the figure, between level 0 and level 2, as the level rises one step, one dot is added to the pixel. At level 3 and level 4, two dots are added when the level rises one step. Generally, in areas of low grayscale level a graininess becomes an issue and thus dot emphasis should be avoided as practically as possible. In areas of high grayscale level, the density hardly increases if one or so dot is added and it is desired on the other hand that the highest grayscale level be set as high as possible. In this embodiment therefore, the number of dots to be added is set large as the grayscale level increases so that one pixel is printed with up to six dots.

It is noted, however, that the number of dots does not limit this invention. It is possible to add two dots at a time beginning with a low grayscale level and the final number of printed dots in one pixel may be larger than six. If the number of printed dots in one pixel is made up with that of the high quality photo mode, it is desired that eight dots be printed at level 4. In a mode that puts importance on image quality, such as the high quality photo mode, a glossy print medium with a large ink receiving capacity is often used. However, in a high speed mode that prints documents such as tables and texts, a print medium with not so large an ink receiving capacity, such as plain paper, is often used. Therefore, the high speed mode of this embodiment does no use so much ink as used in the high quality photo mode.

No matter how many dots are formed, if it is possible to print those dots, more (or fewer) than the number of element areas, which are determined by the dot arrangement patterning processing and to uniquely determine the number of dots to be printed for each grayscale level in the dot arrangement patterning processing, this invention can be effectively applied. With this arrangement, an output pattern can be matched one-to-one to each input level and at the same time, at each level, the dot pattern can have emphasis dots added in an appropriate state. In other words, by assuming that the print data is output in the form of an emphasized dot pattern, such as shown in FIG. 8, preceding processing (i.e., from preceding process to half-toning) can be executed accordingly.

Referring again to FIG. 1, the 1-bit data processed by the mask data conversion processing J0008 is sent to the head drive circuit J0009 where it is further converted into a drive pulse for the print head J0010 that causes the print head to eject ink at predetermined timings.

As described above, in an ink jet printing apparatus of this embodiment in which the print density is so set as to achieve a desired grayscale using small ink droplets of 2, while a high speed mode is provided for printing an image at a lower print density, mask data conversion processing that produces a desired print density is also provided. An image formed by these mask patterns is characterized in that a desired linearity is maintained for the grayscale level in one pixel following the half-toning processing.

(Outline Construction of Mechanism of Ink Jet Printing Apparatus)

An outline construction of a mechanism in the ink jet printing apparatus of this embodiment will be described. The printing apparatus body of this embodiment has, in terms of functions, a paper feed unit, a paper transport unit, a carriage unit, a paper discharge unit, a cleaning unit and an enclosure that protects these units and provides a stylish or unique appearance. These units are briefly described in the following.

Figure 11:
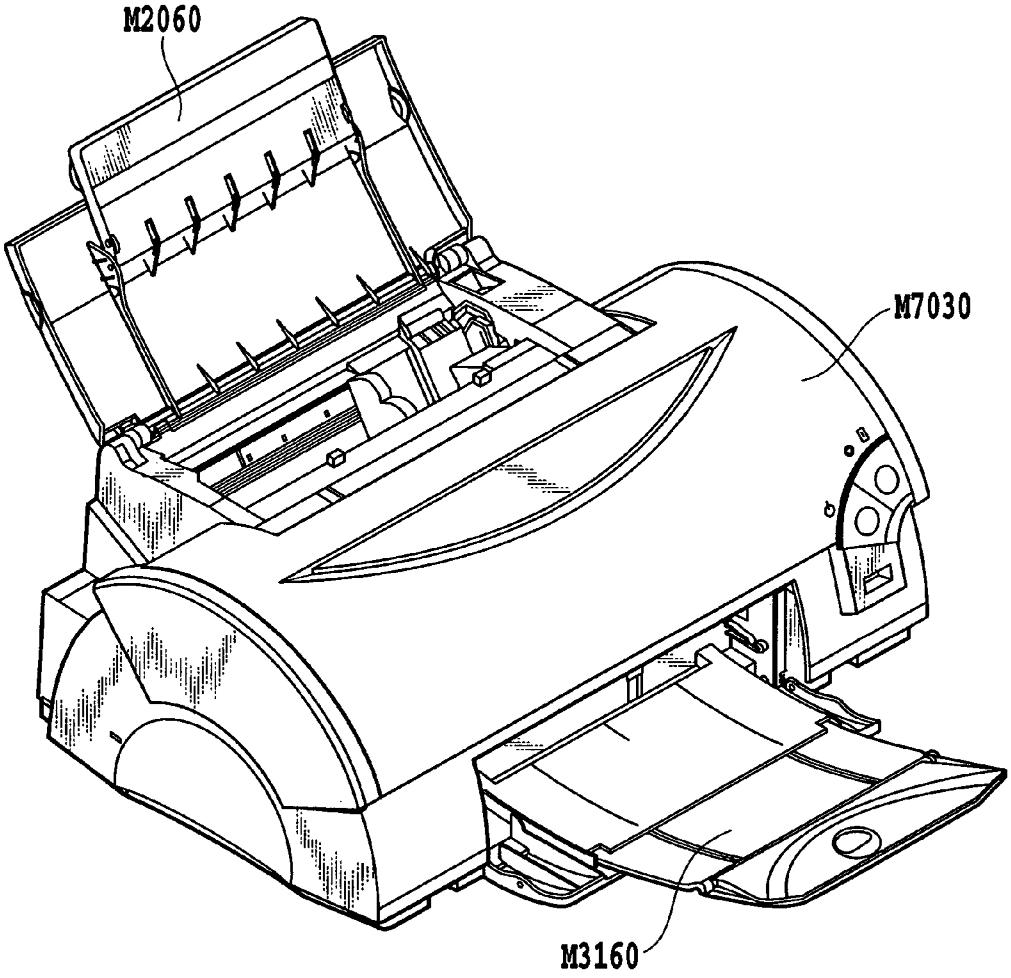
FIG. 11 is a perspective view of an ink jet printing apparatus applied to the above embodiments of this invention.
Figure 12:
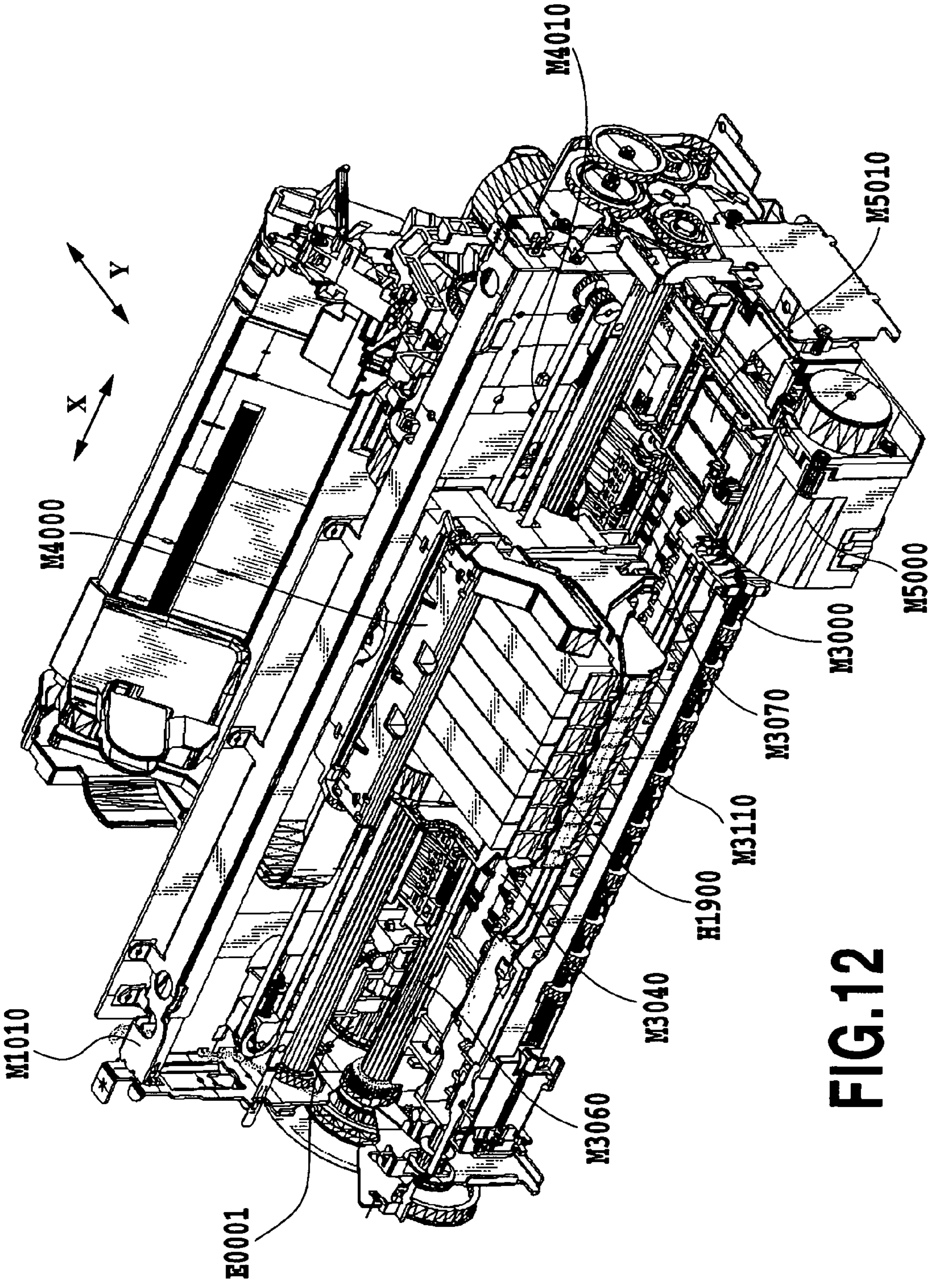
FIG. 12 is a perspective view showing an internal mechanism of the ink jet printing apparatus applied to the embodiments of this invention.
Figure 13:
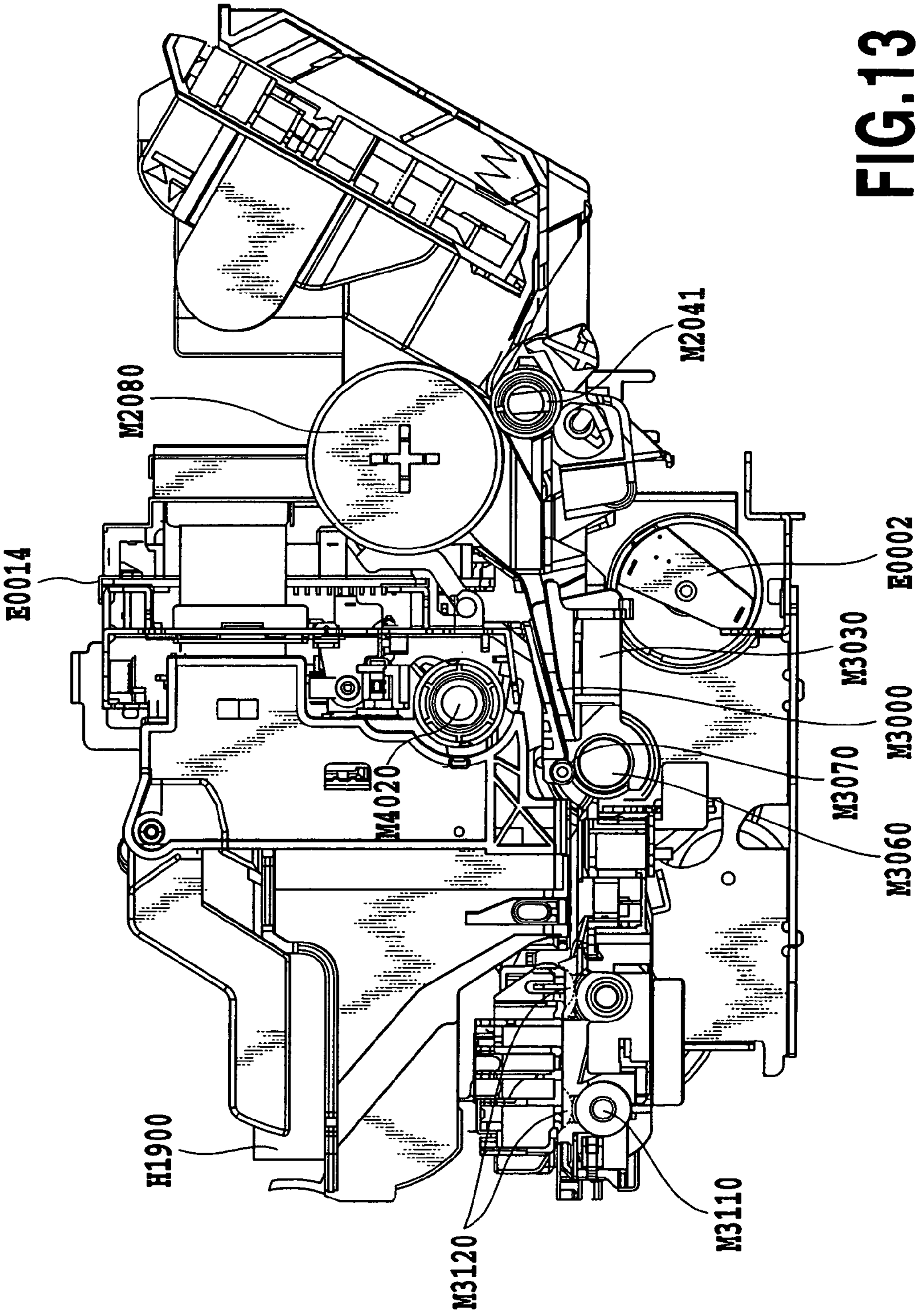
FIG. 13 is a side cross-sectional view showing the internal mechanism of the ink jet printing apparatus applied to the embodiments of this invention.

FIG. 11 is a perspective view of the printing apparatus. FIG. 12 and FIG. 13 show an inner mechanism of the printing apparatus body. FIG. 12 is a perspective view as seen from an upper right part of the apparatus body and FIG. 13 is a side cross-sectional view of the printing apparatus body.

In feeding a print medium in the printing apparatus body, only a predetermined number of sheets are fed from the paper feed unit including a paper tray M2060 to a nip portion formed by a paper feed roller M2080 and a separation roller M2041. In the nip portion only the uppermost of the print medium sheets is separated from the rest and fed to the paper transport unit. The sheet fed to the paper transport unit is guided by a pinch roller holder M3000 and a paper guide flapper M3030 to a roller pair consisting of a transport roller M3060 and a pinch roller M3070. The roller pair of the transport roller M3060 and the pinch roller M3070 is driven by an LF motor E0002 to transport the sheet over a platen M3040.

The carriage unit has a carriage M4000 on which the print head H1001 is mounted and which is supported on a guide shaft M4020 and a guide rail. The guide shaft M4020 is secured to a chassis M1010 and supports and guides the carriage M4000 to reciprocally scan in a direction perpendicular to the transport direction of the print medium. The carriage M4000 is driven by a carriage motor E0001 mounted on the chassis M1010 through a timing belt M4041. Further, the carriage M4000 is connected with a flexible cable, not shown, which transfers a drive signal from an electric circuit board E0014 to the print head H1001. In this construction, to form an image on a print medium, the print medium is transported in a transport direction (column direction) by the roller pair consisting of the transport roller M3060 and the pinch roller M3070 and then positioned. In a scan direction (raster direction) perpendicular to the transport direction, the carriage motor E0001 moves the carriage M4000 to locate the print head H1001 (FIG. 14) at a destination image forming position.

The positioned print head H1001 ejects ink onto the print medium according to the signal from the electric circuit board E0014. Details of the print head H1001 will be described later. In the printing apparatus of this embodiment, an image is formed on the print medium by repetitively alternating a main scan, in which the print head H1001 prints on the print medium while the carriage M4000 is moved, and a sub-scan, in which the print medium is moved by the transport roller M3060.

The print medium printed in this manner is held by a nip portion between a first discharge roller M3110 and spurs M3120 and discharged onto a discharge tray M3160.

In the cleaning unit, to clean the print head H1001 before and after the printing operation, a cap M5010 is attached hermetically to nozzle openings of the print head H1001 and, in this state, a pump M5000 is activated to suck out viscous ink from the print head H1001. By sucking out residual ink from the cap M5010 in an open state, the residual ink is prevented from solidifying in the cap and thereby forestalls possible troubles associated with it.

(Construction of Print Head)

The construction of the head cartridge H1000 applied in this embodiment will be explained as follows. The head cartridge H1000 has a print head H1001, a means to mount an ink tank H1900 and a means to supply ink from the ink tank H1900 to the print head, and is removably mounted on the carriage M4000.

Figure 14:
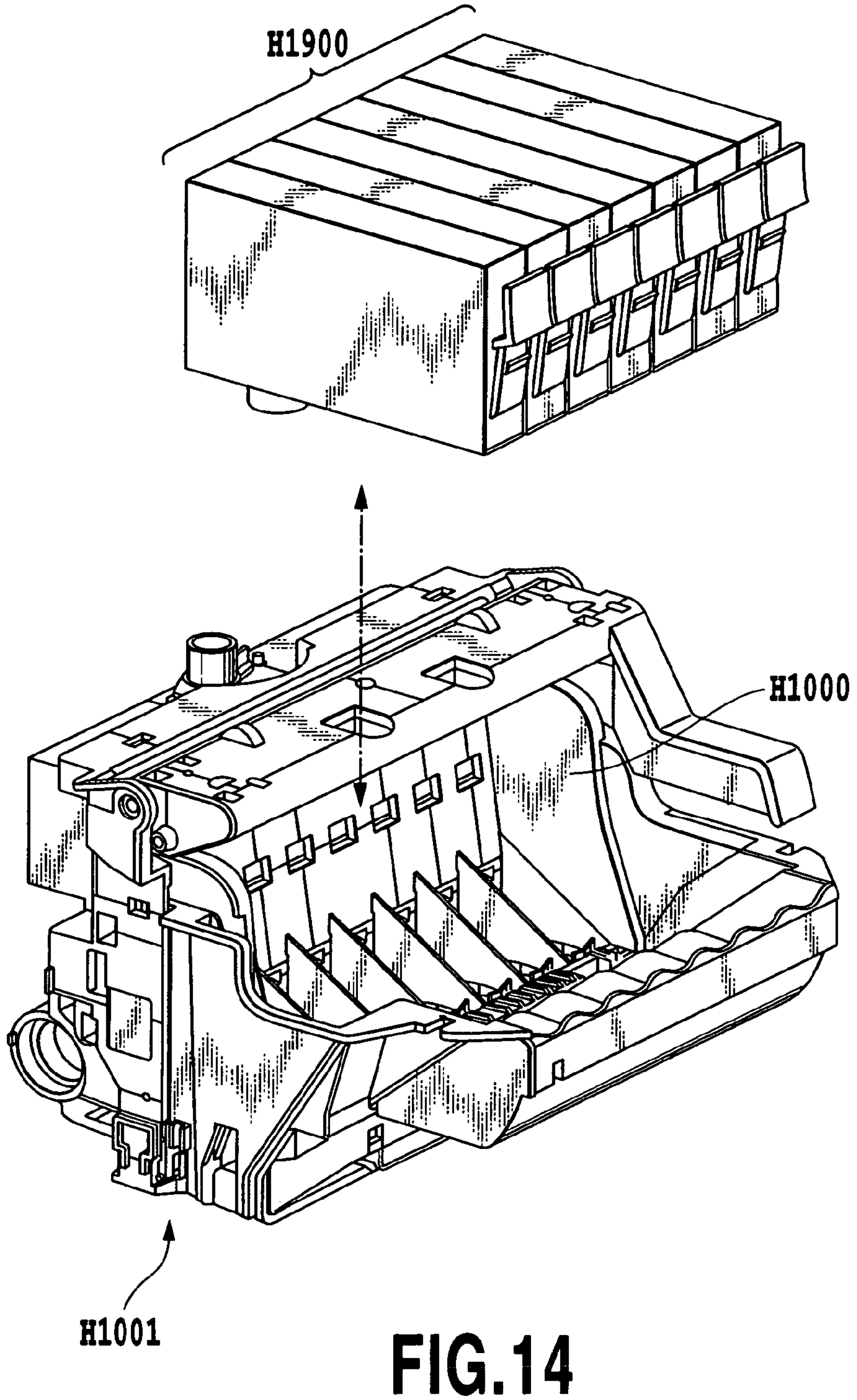
FIG. 14 illustrates how an ink tank H1900 is mounted on a head cartridge H1000 applied to the embodiments of this invention.

FIG. 14 shows how the ink tank H1900 is mounted on the head cartridge H1000 applicable to this embodiment. Since the printing apparatus forms an image with seven color inks, cyan, light cyan, magenta, light magenta, yellow, black and red, the ink tank H1900 also has seven independent tanks one for each color. As shown in the figure, each ink tank H1900 is removably mounted on the head cartridge H1000. The mounting and dismounting of the ink tank H1900 can be done, with the head cartridge H1000 mounted on the carriage M4000.

Figure 15:
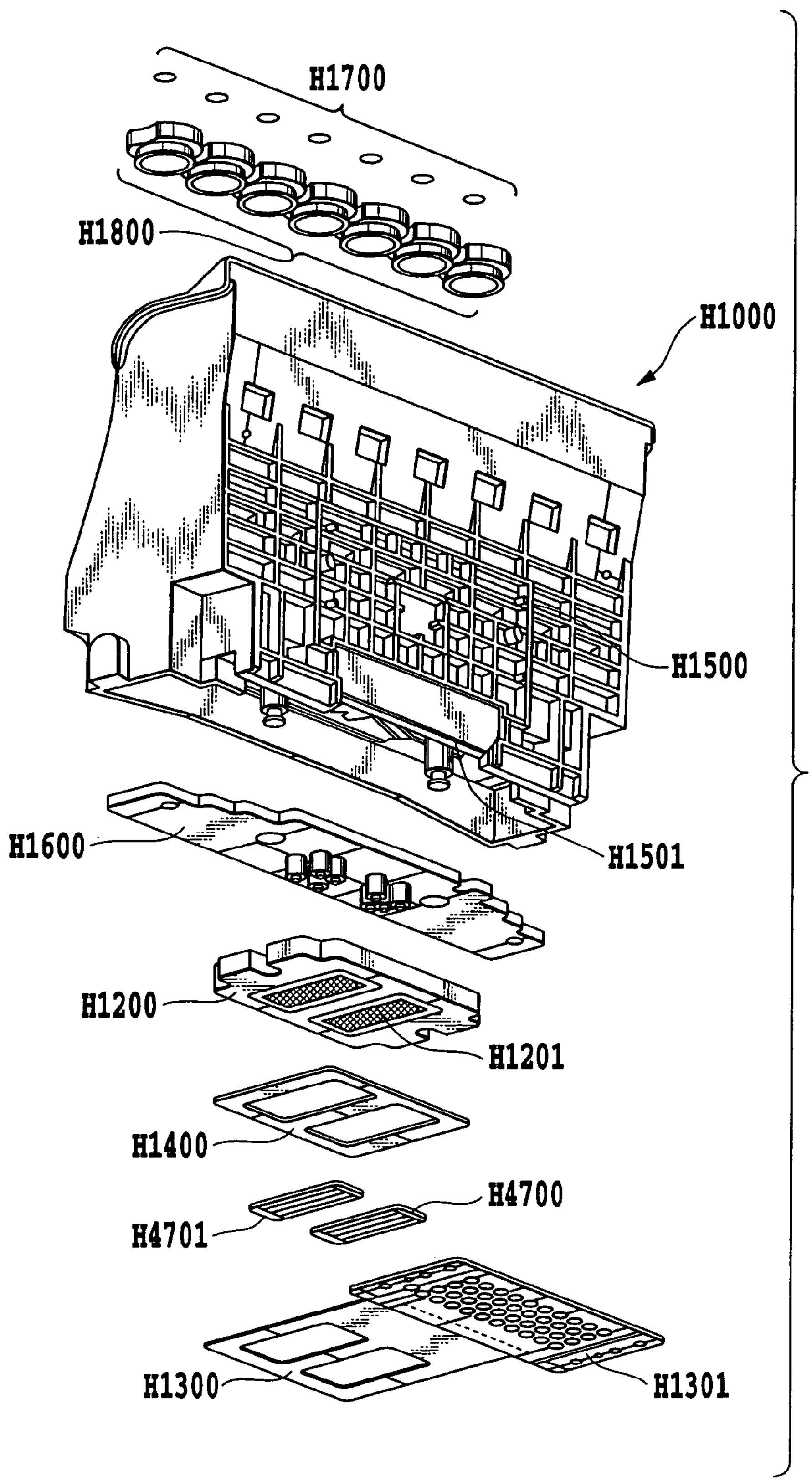
FIG. 15 is an exploded perspective view of the head cartridge H1000 applied to the embodiments of this invention.

FIG. 15 is an exploded perspective view of the head cartridge H1000. In the figure, the head cartridge H1000 includes a first nozzle substrate H4700, a second nozzle substrate H4701, a first plate H1200, a second plate H1400, an electric wiring board H1300, a tank holder H1500, a path forming member H1600, a filter H1700 and a seal rubber H1800.

The first nozzle substrate H4700 and the second nozzle substrate H4701 are silicone substrates which are formed with a plurality of ink ejection nozzles by photolithography on one side thereof. Electric wires of aluminum for supplying electricity to individual nozzles are formed by a deposition technique and a plurality of ink paths corresponding to the individual nozzles are also formed by the photolithography. Further, ink supply ports are formed on the back side of these nozzle substrates to supply ink to the plurality of ink paths.

Figure 16:
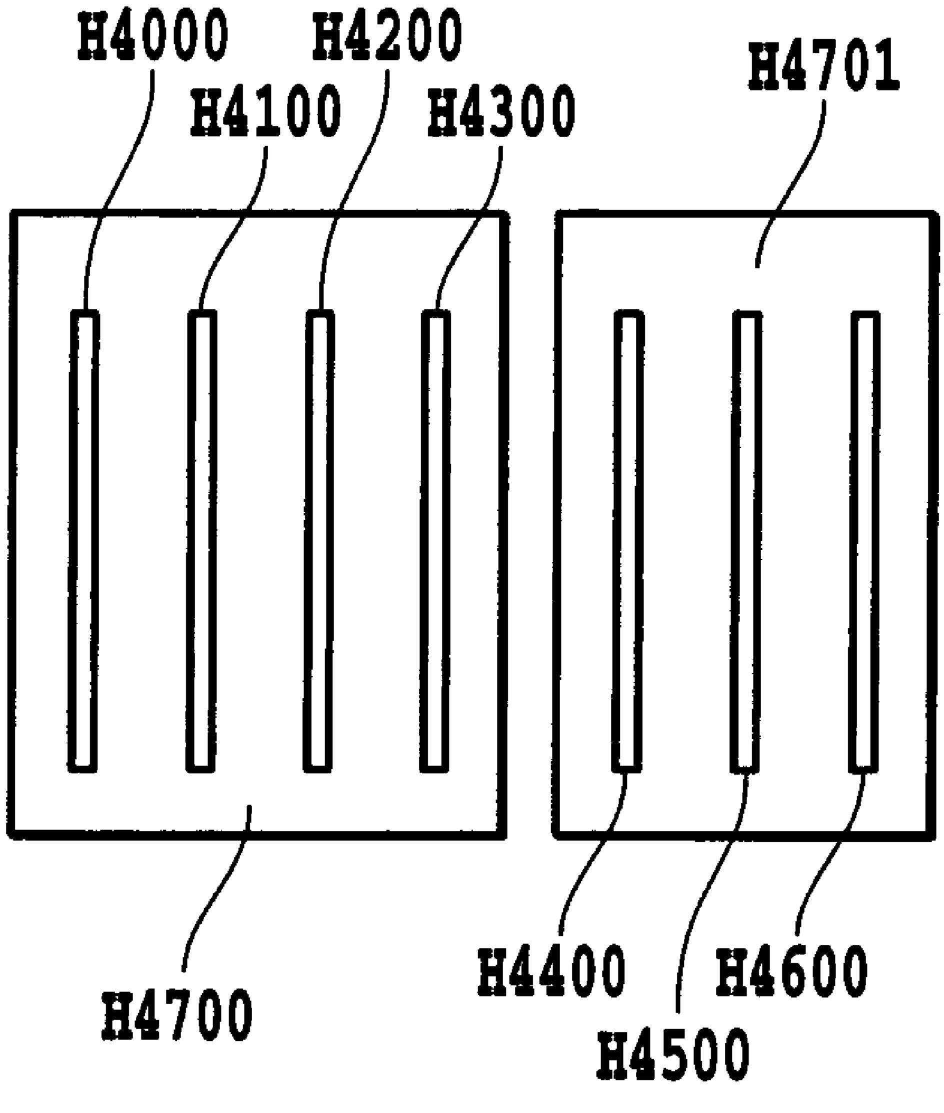
FIG. 16 shows front enlarged views of a first nozzle substrate H4700 and a second nozzle substrate H4701.

FIG. 16 is an enlarged front view of the first nozzle substrate H4700 and the second nozzle substrate H4701. H4000–H4600 represent nozzle columns for different color inks. The first nozzle substrate H4700 has four nozzle columns supplied with four different color inks—a nozzle column H4000 for light magenta, a nozzle column H4100 for a red ink, a nozzle column H4200 for a black ink and a nozzle column H4300 for a light cyan ink. The second nozzle substrate H4701 has three nozzle columns supplied with three different color inks—a nozzle column H4400 for a cyan ink, a nozzle column H4500 for a magenta ink and a nozzle column H4600 for a yellow ink.

Each of the nozzle columns has 768 nozzles arrayed at intervals of 1200 dpi in the print medium transport direction, each nozzle ejecting an ink droplet of about 2 picoliter. Each nozzle has an opening area of about 100 $\mu m^2$. Referring again to FIG. 15, the first nozzle substrate H4700 and the second nozzle substrate H4701 are securely bonded to the first plate H1200 in which ink supply ports H1201 for supplying ink to the first nozzle substrate H4700 and the second nozzle substrate H4701 are formed.

The first plate H1200 is securely bonded with the second plate H1400 having openings. The second plate H1400 has the electric wiring board H1300 that electrically connects to the first nozzle substrate H4700 and the second nozzle substrate H4701.

The electric wiring board H1300 applies electric signals to the first nozzle substrate H4700 and the second nozzle substrate H4701 to cause them to eject ink from their nozzles. The electric wiring board H1300 has electric wires for the first nozzle substrate H4700 and the second nozzle substrate H4701 and an external signal input terminal H1301 situated at an end of the electric wires to receive electric signals from the printing apparatus body. The external signal input terminal H1301 is positioned and secured on the back side of the tank holder H1500.

The tank holder H1500 that holds the ink tank H1900 is securely attached with the path forming member H1600 as by ultrasonic fusing to form ink paths H1501 running from the ink tank H1900 to the first plate H1200.

At the end of the ink paths H1501 on the ink tank side that connects with the ink tank H1900, a filter H1700 is provided to prevent an ingress of dust from outside. The engagement portion with the ink tank H1900 is attached with a seal rubber H1800 to prevent ink evaporation from the engagement portion.

Further, the tank holder unit, made up of the tank holder H1500, the path forming member H1600, the filter H1700 and the seal rubber H1800, and the print head H1001, made up of the first nozzle substrate H4700, the second nozzle substrate H4701, the first plate H1200, the electric wiring board H1300 and the second plate H1400, are joined together as by bonding to form the head cartridge H1000.

(Second Embodiment)

Next, a second embodiment of this invention will be described. In the first embodiment a printing mode that prints at a lower print density than the high quality photo mode is set as a high speed mode. This embodiment attempts to realize the high quality photo mode at the same print density as in the first embodiment by using smaller ink droplets.

In this embodiment, too, the flow of the image data conversion processing of FIG. 1 can also be applied. It is noted, however, that this embodiment uses only four colors, cyan, magenta, yellow and black, and does not use red, light cyan and light magenta. Thus, the subsequent process J0003 transforms RGB 8-bit data into CMYK 8-bit data and the subsequent processing processes data of the four colors C, M, Y and K.

The half-toning J0005 performs a quantization by the multi-value error diffusion method to transform 8-bit color separation data into 4-bit data, thereby converting 256 grayscale levels into 9 levels.

It is noted that the print head J0010 used in this embodiment ejects ink droplets of about 1 pl. This is intended to make less noticeable the graininess produced during a low duty printing by setting the ejection volume, i.e., the size of dots on the print medium, even smaller.

If, with the dot size made small, the printing is done in a mode similar to the high quality photo mode of the first embodiment, the amount of ink applied may become insufficient, giving rise to a fear of density shortfall. In such a situation the conventional method dictates setting the print density high according to the size of dots formed. However, setting the print resolution high in the printing apparatus requires improvements of the print position accuracy and of the print medium transport accuracy and also greater capacities for data processing including the dot arrangement patterning processing, which in turn results in a more complex and costly apparatus. The picture quality in the market, however, does not place so great an importance on the print resolution but requires eliminating the graininess to some extent and securing a predetermined level of tonality and grayscale. Thus, this embodiment attempts to realize a high quality photo mode by setting ink droplets to a small volume of 1 pl to reduce a granular impression and at the same time using the same printing apparatus as the first embodiment without increasing the print density and precision.

In the high quality photo mode of this embodiment, the dot arrangement patterning processing J0007 can be the same as shown in FIG. 2. That is, in each pixel area, which is 600 ppi vertically and horizontally and output from the half-toning processing as 9-value data, ink droplets of 1 pl are printed at a print density of 1200 dpi vertically and 2400 dpi horizontally.

In the high quality photo mode of this embodiment, 4-pass printing is performed. Although mask patterns applied to this case are not shown, they are intended for use on a total of 768 nozzles divided into four groups of 192 nozzles as in FIG. 4. It is noted, however, that the mask patterns allocated to the four nozzle groups each provide a 50% duty so that a final print duty obtained by overlapping these mask patterns is 200%.

Figure 9:
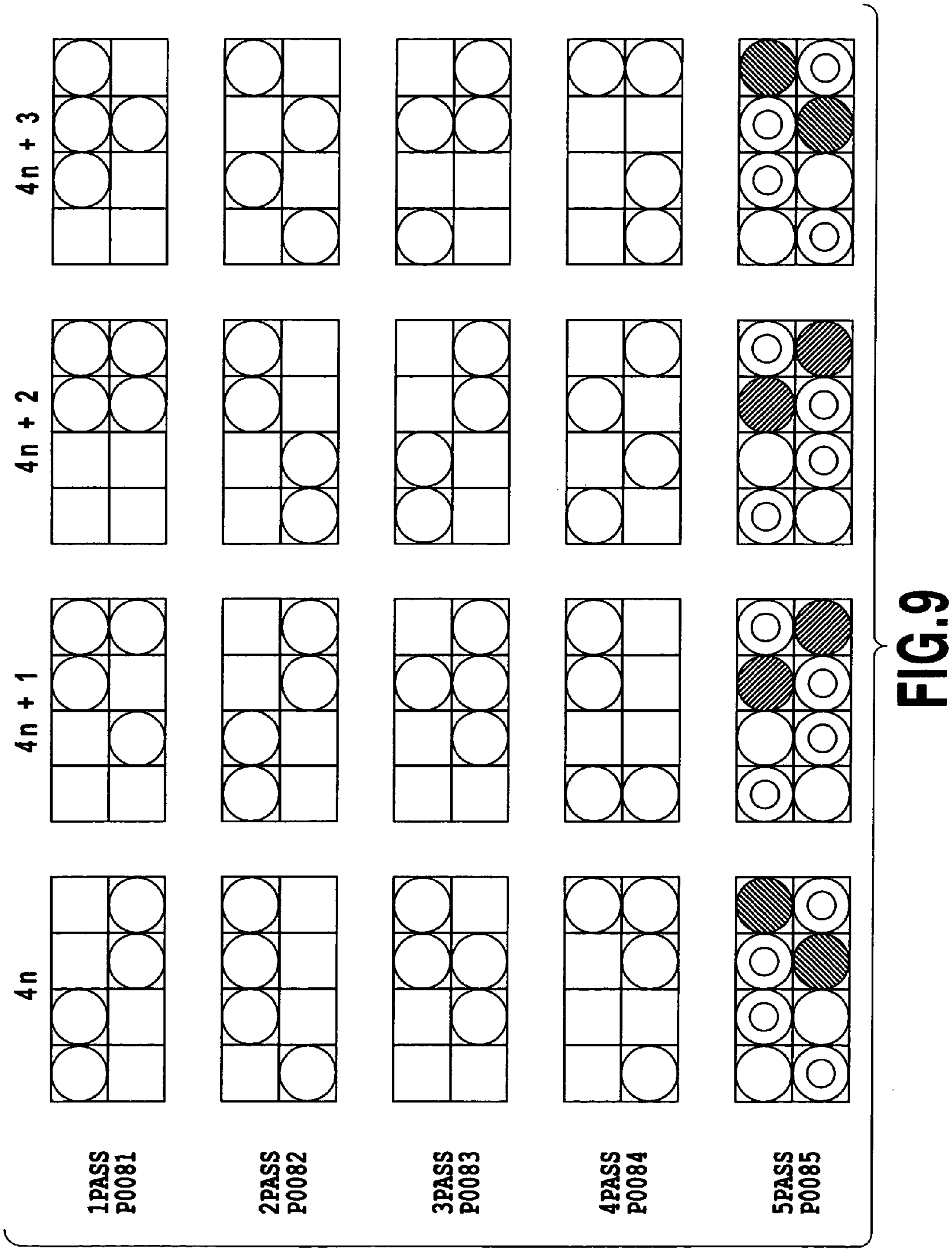
FIG. 9 illustrates 2×4-element areas at an upper left corner of mask patterns corresponding to the respective nozzle groups of the 4-pass mask pattern in a second embodiment of this invention.

In the above 4-pass mask pattern, FIG. 9 shows, in a way similar to FIG. 7, an area of 2 element areas×4element areas situated at an upper left corner of a pattern printed by each nozzle group. The four areas P0081–P0084 are overlapped together on a print medium to produce a printed area of P0085. In P0081–P0084, element areas marked with a white circle represent element areas to which an ink drop of 1 pl is applied during the scan. In P0085, element areas marked with a white circle represent element areas in which one dot of 1 pl is printed and element areas marked with a double circle represent element areas in which two 1-pl dots, i.e., 2 pl of ink, is printed. Further, element areas marked with a black circle represent element areas in which three 1-pl dots, i.e., 3 pl of ink, is printed. The arrangements of black circles, double circles and white circles in one pixel are as shown in P0085. One pixel area, or 2 element areas×4element areas, is printed with up to 16 dots.

Further, as in FIG. 2, FIG. 9 also shows in columns (4n)–(4n+3) a plurality of different patterns that appear cyclically according to the pixel position. The 2×4element areas can be handled as one pixel area that represents a grayscale level output by the half-toning processing.

Figure 10:
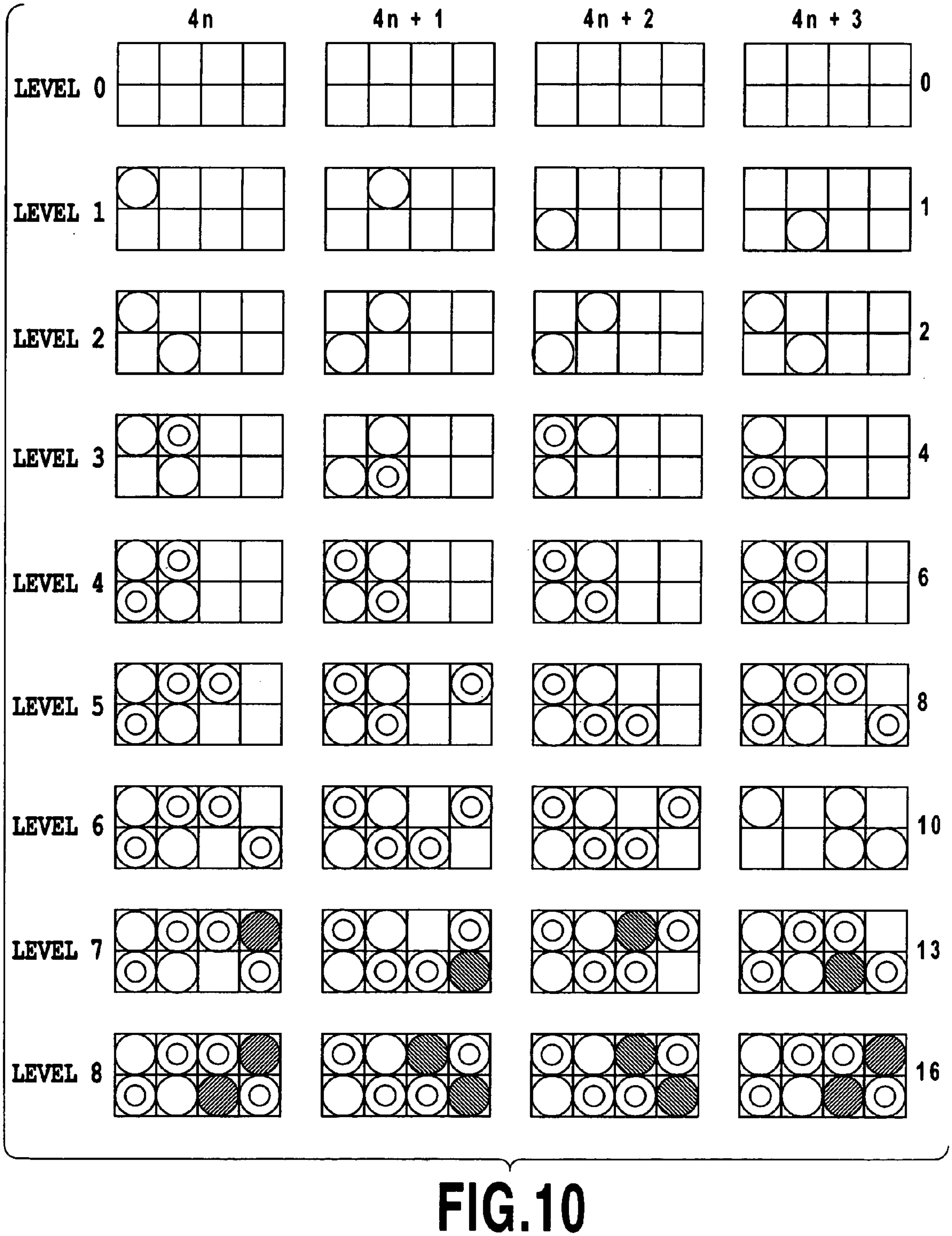
FIG. 10 illustrates dot arrangements and the number of dots printed in 1-pixel areas for the input levels 0–8 of FIG. 9.

FIG. 10 shows dot arrangements and the number of dots printed in one pixel area for input levels 0–8. In the figure, white circles represent element areas in which one 1-pl ink drop is printed, double circles represent element areas in which two 1-pl ink drops are printed, black circles represent element areas in which three 1-pl ink drops are printed, and blank areas represent element areas in which no ink drop is printed. As can be seen from the figure, at level 0 to level 2, one dot is added as the level rises one step. At level 3 to level 6, two dots are added as the level rises one step. At level 7 and level 8, three dots are added for one-step level increment.

As already described in the first embodiment, the graininess becomes more of an issue in low grayscale areas and thus a dot emphasis should be avoided as practically as possible in low grayscale areas. As the grayscale level increases, the addition of one or so dot hardly results in an increase in density. It is desired on the other hand that the highest grayscale level be set as high as possible. In this embodiment, too, the number of dots to be added is set large as the grayscale level increases so that one pixel is printed with up to 16 dots. It is noted, however, that this configuration does not limit this embodiment. The present invention and this embodiment are effective no matter how many dots are printed in one pixel area in whatever arrangement, as long as the number of dots printed in one pixel area increases monotonously according to the grayscale level output from the half-toning processing.

As in the first embodiment, 1-bit data processed by the mask data conversion processing J0008 is fed to the head drive circuit J0009 where it is converted into a drive pulse for the print head J0010 that causes the print head to eject ink at predetermined timings.

In an ink jet printing apparatus in which a print density is set to achieve a desired grayscale using ink drops of 2 pl, as explained in the first embodiment, this second embodiment reduces the ejection volume to 1 pl and can still minimize the graininess of an image printed at a low duty without using light inks such as light cyan and light magenta. To compensate for a reduction in the ejection volume, from 2 pl to 1 pl, mask patterns that match the dot arrangement patterns of FIG. 9 are prepared. This arrangement makes it possible to maintain an appropriate monotonous increase in the amount of ink applied to one pixel according to the grayscale level and also to print 16 pl of ink in one pixel area at the highest grayscale level, which is equal to the amount of ink in the high quality photo mode of the first embodiment. As a result, a high quality image, which required for pictures, can be produced by data processing which is much smaller scale than that of the first embodiment.

This configuration produces the same effect as if printing was done by using a print head capable of modulating the ejection volume between 1 pl and 16 pl when in fact the print head actually used can hardly modulate the ejection volume. In addition, since the printing of 16 pl of ink is done in a plurality of scans, with each scan applying a part of the total ejection volume of 16 pl using a different nozzle group, an improved image can be obtained. In practice, in a print head capable of modulating the ejection volume, it is difficult to arrange its nozzles at such a high density as the print density of this embodiment. The fact that the same printing effect is realized as if a print head having densely arrayed nozzles and capable of modulating the ejection volume was used, is advantageous in terms of both a printing speed and an image quality.

The mask patterns applicable in this invention are not limited to those described in the above embodiments. This invention is effective as long as the number of dots printed in one pixel in a plurality of scans matches the grayscale level determined by the half-toning processing. The arrangement of dots printed in each scan may take any desired form.

The technique for emphasizing selected dots in the same area as input data by using multi-pass mask patterns is already disclosed in Japanese Patent Application Laid-open No. 05-278232(1993). The conventional emphasized printing as represented by Japanese Patent Application Laid-open No. 05-278232(1993), however, determines the emphasized dots by using a mask pattern irrespective of the gray scale data. That is, in a configuration which, after determining a multi-valued grayscale data by the half-toning processing, further refines the grayscale by the dot arrangement patterning processing, as in the printing apparatus of this embodiment, because the conventional method performs the dot emphasizing totally irrespective of the dot arrangement in one pixel area, the multi-valued grayscale data assigned to one pixel loses its significance. On the contrary, this invention produces a mask pattern by considering a dot arrangement pattern that matches the multi-valued grayscale data given to that pixel. That is, this invention allows for an emphasized printing which is equal among pixels and almost linear, leaving intact the significance of the multi-valued grayscale data given to one pixel. This is a feature of this invention.

It should be noted here that some modifications (e.g., modifications of the number of grayscale levels determined by the half-toning processing, the number of dots in the dot arrangement pattern and the number of main scans performed over the same area) can be applied to the preceding embodiments without departing from the spirit of this invention. All items included in this specification and all items shown in the accompanying drawings should be construed to have been presented by way of example only, and are not intended to limit the invention. The scope of this invention is determined by the scope of claims.

With this invention, since a larger number of dots than is provided by the dot arrangement pattern can be printed according to a grayscale level, an image can be produced that has higher grayscale and tonality than is possible with the conventional dot arrangement pattern. Therefore, although the ink jet print head which has a fixed small ink ejection volume is used, an image with desired density can be produced by performing data processing and printing at a lower pixel density than an appropriate print density for the fixed small ejection volume.

The present invention has been described in detail with respect to preferred embodiments, and it will now be apparent from the foregoing to those skilled in the art that changes and modifications may be made without departing from the invention in its broader aspect, and it is the intention, therefore, the appended claims cover all such changes and modifications as fall within the true spirit of the invention.

This application claims priority from Japanese Patent Application No. 2003-343690 filed Oct. 1, 2003, which is hereby incorporated by reference herein.

What is claimed is:

1. An ink jet printing method to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing method comprising:

an allocation step of allocating a dot arrangement pattern to each pixel according to a grayscale level of the pixel, the dot arrangement pattern determining the presence or absence of a printed dot in each of the element areas making up the pixel, a plurality of dot arrangement patterns forming the matrix of the pixels;

an ejection data generation step of dividing the printing of dots, which is based on the dot arrangement pattern produced by the allocation step, into a plurality of scans of the print head by using mask patterns and generating ejection data for each of the scans; and an ejection step of ejecting ink from the print head according to the ejection data generated by the ejection data generation step, wherein the mask patterns and the dot arrangement patterns are linked with each other so that the number of actually printed dots in a pixel having a predetermined grayscale level is greater than the number of dots determined by the allocation step by a predetermined number.

2. An ink jet printing method according to claim 1, wherein the mask patterns and the dot arrangement patterns are linked with each other so that, the higher the predetermined grayscale level, the number of dots actually printed in the pixel is greater than the number of dots determined by the allocation step.

3. A control program stored in a computer-readable medium and realizing the ink jet printing method of claim 1.

4. An ink jet printing method to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing method comprising:

a conversion step of converting the multi-valued grayscale level into a binary level by allocating a dot arrangement pattern to each pixel according to the grayscale level of the pixel, the dot arrangement pattern determining the presence or absence of a printed dot in each of the element areas making up the pixel, a plurality of dot arrangement patterns forming the matrix of the pixels;

a data generation step of dividing the printing of dots, which is based on the dot arrangement pattern produced by the conversion step, into a plurality of scans of the print head by using mask patterns and generating ejection data for each of the scans; and an ejection step of ejecting ink from the print head according to the ejection data generated by the ejection data generation step, wherein the mask patterns and the dot arrangement patterns are linked with each other so that, for pixels having a first multi-valued grayscale level, the number of actually printed dots is greater than the number of dots determined by the conversion step and that, for pixels having a second multi-valued grayscale level, which is lower than the first multi-valued grayscale level, the number of actually printed dots is equal to the number of dots determined by the conversion step.

5. An ink jet printing system to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing system comprising:

conversion means for converting the multi-valued grayscale level into a binary level by allocating a dot arrangement pattern to each pixel according to the grayscale level of the pixel, the dot arrangement pattern determining the presence or absence of a printed dot in each of the element areas making up the pixel, a plurality of dot arrangement patterns forming the matrix of the pixels;

ejection data generation means for dividing the printing of dots, which is based on the dot arrangement pattern produced by the conversion means, into a plurality of scans of the print head by using mask patterns and for generating ejection data for each of the scans; and ejection means for ejecting ink from the print head according to the ejection data generated by the ejection data generation means, wherein the mask patterns and the dot arrangement patterns are related with each other so that, for pixels having a first multi-valued grayscale level, the number of actually printed dots is a greater than the number of dots determined by the conversion means and that, for pixels having a second multi-valued grayscale level, which is lower than the first multi-valued grayscale level, the number of actually printed dots is equal to the number of dots determined by the conversion means.

6. An ink jet printing system to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing system comprising:

allocation means for allocating a dot arrangement pattern to each pixel according to a grayscale level of the pixel, the dot arrangement pattern determining the presence or absence of a printed dot in each of the element areas making up the pixel, a plurality of dot arrangement patterns forming the matrix of the pixels;

ejection data generation means for dividing the printing of dots, which is based on the dot arrangement pattern produced by the allocation means, into a plurality of scans of the print head by using mask patterns and for generating ejection data for each of the scans; and ejection means for ejecting ink from the print head according to the ejection data generated by the ejection data generation means, wherein the mask patterns and the dot arrangement patterns are linked with each other so that the number of actually printed dots in a pixel having a predetermined grayscale level is greater than the number of dots determined by the allocation means by a predetermined number.

7. An ink jet printing system to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing system comprising:

conversion means for converting the multi-valued grayscale level to a binary level by allocating a dot arrangement pattern to each pixel according to a grayscale level of the pixel, the dot arrangement pattern determining the presence or absence of a printed dot in each of the element areas making up the pixel, a plurality of dot arrangement patterns forming the matrix of the pixels;

ejection data generation means for dividing the printing of dots, which is based on the dot arrangement pattern produced by the conversion means, into a plurality of scans of the print head by using mask patterns and for generating ejection data for each of the scans; and ejection means for ejecting ink from the print head according to the ejection data generated by the ejection data generation means, wherein the ejection data generation means adopts the mask patterns that cause a plurality of dots to be printed overlappingly in each of predetermined element areas and the conversion means adopts the dot arrangement patterns so linked with the mask patterns that a total number of dots printed in the pixel is uniquely determined by the multi-valued grayscale level.

8. An ink jet printing system according to claim 7, wherein the mask patterns and the dot arrangement patterns are so linked with each other that, when the multi-valued grayscale level of the pixel is a low level including a lowest level, the number of actually printed dots is equal to the number of dots determined by the conversion means.

9. An ink jet printing system according to claim 7, wherein the mask patterns and the dot arrangement patterns are so linked with each other that, when the multi-valued grayscale level of the pixel is a low level including a lowest level, one dot is actually printed in an element area which is allocated one dot by the conversion means.

10. An ink jet printing system according to claim 7, wherein the mask patterns and the dot arrangement patterns are so linked with each other that, when the multi-valued grayscale level of the pixel is a high level including a highest level, two or more dots are actually printed in an element area which is allocated one dot by the conversion means.

11. An ink jet printing system to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing system comprising:

first conversion means for converting the multi-valued grayscale level to a binary level by allocating a first dot arrangement pattern to each pixel according to a grayscale level of the pixel, the first dot arrangement pattern determining the presence or absence of a printed dot in each of the element areas making up the pixel;

second conversion means for converting the multi-valued grayscale level to a binary level by allocating a second dot arrangement pattern to each pixel according to a grayscale level of the pixel, the second dot arrangement pattern determining the presence or absence of a printed dot in each of the element areas making up the pixel;

first ejection data generation means for dividing the printing of dots, which is based on the first dot arrangement pattern produced by the first conversion means, into a plurality of scans of the print head by using a first mask pattern and for generating ejection data for each of the scans;

second ejection data generation means for dividing the printing of dots, which is based on the second dot arrangement pattern produced by the second conversion means, into a plurality of scans of the print head by using a second mask pattern and for generating ejection data for each of the scans; and ejection means for ejecting ink from the print head according to the ejection data generated by the first ejection data generation means or the second ejection data generation wherein the first mask pattern and the first dot arrangement pattern are so linked with each other that the number of actually printed dots is equal to the number of dots determined by the first conversion means, and the second mask pattern and the second dot arrangement pattern are so linked with each other that the number of actually printed dots is greater than the number of dots determined by the second conversion means.

12. An ink jet printing system according to claim 11, further comprising:

a first print mode to perform an image data conversion by using the first conversion means and the first ejection data generation means;

a second print mode to perform an image data conversion by using the second conversion means and the second ejection data generation means; and print mode selection means for selecting one of the first print mode and the second print mode to form an image on the print medium.

13. An ink jet printing apparatus to form an image on a print medium by scanning a print head over the print medium a plurality of times, wherein the print head ejects ink to form dots on the print medium according to image information made up of a matrix of pixels, each of which pixel has a multi-valued grayscale level expressed by a combination of printing and non-printing of dots in element areas making up the pixel, the ink jet printing apparatus comprising:

a computer-readable storage unit to store dot arrangement patterns used to convert the multi-valued grayscale level to a binary level by allocating a dot arrangement pattern to each pixel according to a grayscale level of the pixel, the dot arrangement pattern determining the presence or absence of a printed dot in each of the element areas making up the pixel; and a computer-readable storage unit to store mask patterns used to divide the printing of dots, which is based on the dot arrangement pattern, into a plurality of scans of the print head and generate ejection data for each of the scans, wherein the mask patterns and the dot arrangement patterns are related with each other so that, for pixels having a first multi-valued grayscale level, the number of actually printed dots is greater than the number of dots determined by the allocated dot arrangement pattern and that, for pixels having a second multi-valued grayscale level, which is lower than the first multi-valued grayscale level, the number of actually printed dots is equal to the number of dots determined by the allocated dot arrangement pattern.

* * * * *

UNITED STATES PATENT AND TRADEMARK OFFICE

CERTIFICATE OF CORRECTION

PATENT NO. : 7,261,387 B2
APPLICATION NO. : 10/952791
DATED : August 28, 2007
INVENTOR(S) : Nishikori et al.

It is certified that error appears in the above-identified patent and that said Letters Patent is hereby corrected as shown below:

COLUMN 1:
Line 23, "low-noise" should read --low-noise,--.

COLUMN 2:
Line 42, "each of pixel" should read --each pixel--.
Line 67, "dots the print" should read --dots on the print--.

COLUMN 3:
Line 1, "made up of on" should read --made up of--.

COLUMN 6:
Line 14, "FIG. 7 are" should read --FIG. 7 consists of--.
Line 15, "4×4elements" should read --4×4 elements--.

COLUMN 7:
Line 9, "processing" should read --processings--.
Line 66, "elements×4horizontal" should read --elements × 4 horizontal--.

COLUMN 8:
Line 1, "the areas" should read --each area--, and "correspond" should read --corresponding--.
Line 4, "area" should read --areas--.
Line 43, "dot" should read --dots--.
Line 52, "represent" should read --represents--.
Line 60, "4×4element" should read --4 × 4 element--.

COLUMN 9:
Line 10, "four" should read --each of four--, and "each" should be deleted.
Line 14, "nozzles" should read --nozzle--.

COLUMN 10:
Line 28, "elements×2horizontal" should read --elements × 2 horizontal--.
Line 61, "result" should read --results--.

UNITED STATES PATENT AND TRADEMARK OFFICE

CERTIFICATE OF CORRECTION

PATENT NO. : 7,261,387 B2 
APPLICATION NO. : 10/952791
DATED : August 28, 2007
INVENTOR(S) : Nishikori et al.

It is certified that error appears in the above-identified patent and that said Letters Patent is hereby corrected as shown below:

COLUMN 11:
Line 56, “does no use” should read --does not use--.

COLUMN 15:
Line 37, “areas×4element” should read --areas × 4 element--.
Line 51, “areas×4element” should read --areas × 4 element--.
Line 55, “2×4element” should read --2×4 element--.

COLUMN 16:
Line 39, “required” should read --is required--.

COLUMN 17:
Line 43, “the intention,” should read --intended,--.
Line 44, “the appended” should read --that the appended--.

COLUMN 19:
Line 15, “is a greater” should read --is greater--.

COLUMN 20:
Line 67, “generation wherein” should read --generation means,--.

Signed and Sealed this

Twenty-fourth Day of February, 2009

JOHN DOLL
*Acting Director of the United States Patent and Trademark Office*